US011321596B2

(12) United States Patent
Takesue et al.

(10) Patent No.: US 11,321,596 B2
(45) Date of Patent: May 3, 2022

(54) IMAGE PROCESSING APPARATUS, IMAGE PROCESSING METHOD, AND STORAGE MEDIUM FOR GENERATING QUANTIZED DATA FOR FORMING AN IMAGE ON A PRINT MEDIUM

(71) Applicant: CANON KABUSHIKI KAISHA, Tokyo (JP)

(72) Inventors: Naoya Takesue, Tokyo (JP); Hisashi Ishikawa, Urayasu (JP); Akitoshi Yamada, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/704,257

(22) Filed: Dec. 5, 2019

(65) Prior Publication Data

US 2020/0184289 A1 Jun. 11, 2020

(30) Foreign Application Priority Data

Dec. 7, 2018 (JP) ............................ JP2018-229551
Jan. 30, 2019 (JP) ............................ JP2019-013881

(51) Int. Cl.
*G06K 15/02* (2006.01)
*G06K 15/10* (2006.01)

(52) U.S. Cl.
CPC ......... *G06K 15/1878* (2013.01); *G06K 15/10* (2013.01); *G06K 2215/0094* (2013.01)

(58) Field of Classification Search
None
See application file for complete search history.

(56) References Cited

U.S. PATENT DOCUMENTS 6,867,884 B1 3/2005 Rozzi
7,136,189 B2 11/2006 Sharma et al.
(Continued)

FOREIGN PATENT DOCUMENTS

JP 2014000739 A 1/2014
WO 2002005545 A1 1/2002

OTHER PUBLICATIONS

Extended European Search Report issued by the European Patent Office dated May 12, 2020 in corresponding European Patent Application No. 19213476.5.

*Primary Examiner* — Andrew H Lam
(74) *Attorney, Agent, or Firm* — Carter, DeLuca & Farrell LLP

(57) ABSTRACT

Provided is quantization processing that can reduce color development defect due to dot overlapping and can output an image with reduced granularity when the image is printed by using multiple kinds of colorants. To this end, dot arrangement information for a colorant for which dot arrangement is already determined among multiple kinds of colorants is acquired for a predetermined region of the image, and an evaluation value of each pixel included in the predetermined region is derived based on the arrangement information. In addition, for the predetermined region, a target value for a predetermined colorant for which dot arrangement is yet to be determined is derived based on the image. Then, whether or not to arrange a dot of the predetermined colorant in the predetermined region is determined based on the target value and the evaluation value.

12 Claims, 32 Drawing Sheets

QUANTIZATION PROCESSING
S1000 SET PROCESSING TARGET REGION
S1001 SET PROCESSING TARGET INK COLOR
S1002 LOAD GRADATION DATA
S1003 SET TARGET DOT NUMBER
S1004 ACQUIRE REFERENCE VALUE INFORMATION
S1005 ACQUIRE DOT ARRANGEMENT HISTORY INFORMATION
S1006 SET EVALUATION VALUE INFORMATION
S1007 PERFORM DOT ARRANGEMENT PROCESSING
S1008 UPDATE DOT ARRANGEMENT HISTORY INFORMATION
S1009 OUTPUT QUANTIZED DATA
S1010 COMPLETED FOR ALL INK COLORS ? NO / YES
S1011 COMPLETED FOR ALL UNIT REGIONS ? NO / YES
RETURN

(56) References Cited

U.S. PATENT DOCUMENTS

| | | | | |
|---|---|---|---|---|
| 7,244,010 | B2 | 7/2007 | Yamazaki | |
| 8,760,725 | B1 * | 6/2014 | Keithley | H04N 1/52 358/3.04 |
| 9,201,839 | B2 | 12/2015 | Hara et al. | |
| 9,462,091 | B2 | 10/2016 | Hara et al. | |
| 9,485,388 | B2 | 11/2016 | Kodama et al. | |
| 9,734,439 | B2 | 8/2017 | Hara et al. | |
| 9,749,496 | B2 | 8/2017 | Fujimoto et al. | |
| 10,027,848 | B2 | 7/2018 | Fuse et al. | |
| 10,043,118 | B2 | 8/2018 | Sumi et al. | |
| 10,057,459 | B2 | 8/2018 | Yamamoto et al. | |
| 10,063,743 | B2 | 8/2018 | Fuse et al. | |
| 10,073,370 | B2 | 9/2018 | Takikawa et al. | |
| 10,187,553 | B2 | 1/2019 | Takesue et al. | |
| 10,194,053 | B2 | 1/2019 | Otani et al. | |
| 10,205,854 | B2 | 2/2019 | Shimada et al. | |
| 10,356,282 | B2 | 7/2019 | Ochiai et al. | |
| 2014/0092441 | A1 * | 4/2014 | Nishizaki | H04N 1/6072 358/3.06 |
| 2016/0037018 | A1 * | 2/2016 | Yoshida | H04N 1/401 358/1.2 |
| 2017/0139363 | A1 | 5/2017 | Takikawa et al. | |
| 2019/0156164 | A1 | 5/2019 | Yanai et al. | |
| 2019/0362202 | A1 | 11/2019 | Kikuta et al. | |
| 2020/0074251 | A1 | 3/2020 | Takesue et al. | |
| 2020/0079102 | A1 | 3/2020 | Ochiai et al. | |
| 2020/0156386 | A1 | 5/2020 | Otani et al. | |
| 2020/0171820 | A1 | 6/2020 | Takesue et al. | |

* cited by examiner

| 225 | 93 | 207 | 109 |
|---|---|---|---|
| 20 | 72 | 22 | 98 |
| 79 | 7 | 68 | 229 |
| 100 | 159 | 182 | 86 |

GRADATION DATA

FIG.7B

| 254 | 26 | 134 | 241 | 201 | 41 | 219 | 68 |
|---|---|---|---|---|---|---|---|
| 53 | 213 | 179 | 4 | 120 | 100 | 140 | 176 |
| 105 | 154 | 68 | 90 | 228 | 28 | 250 | 85 |
| 188 | 31 | 221 | 130 | 171 | 59 | 191 | 8 |
| 244 | 114 | 46 | 196 | 19 | 146 | 210 | 112 |
| 12 | 161 | 231 | 79 | 247 | 98 | 67 | 233 |
| 183 | 57 | 137 | 6 | 119 | 165 | 37 | 185 |
| 251 | 87 | 203 | 177 | 51 | 219 | 138 | 80 |
| 211 | 17 | 152 | 93 | 239 | 23 | 195 | 108 |
| 106 | 73 | 224 | 39 | 131 | 70 | 150 | 2 |
| 187 | 30 | 175 | 116 | 207 | 182 | 245 | 86 |
| 232 | 144 | 251 | 58 | 11 | 100 | 45 | 164 |

411

THRESHOLD MATRIX

FIG.7C

| 7 | 8 | 9 | 10 |
|---|---|---|---|
| 6 | 1 | 2 | 11 |
| 5 | 4 | 3 | 12 |
| 16 | 15 | 14 | 13 |

REFERENCE VALUE INFORMATION

FIG.7D

| 10 | 3 | 14 | 8 |
|---|---|---|---|
| 5 | 15 | 1 | 12 |
| 2 | 7 | 4 | 9 |
| 6 | 13 | 11 | 16 |

REFERENCE VALUE INFORMATION

FIG.7E

| 16 | 2 | 9 | 15 |
|---|---|---|---|
| 4 | 13 | 11 | 1 |
| 7 | 10 | 5 | 6 |
| 12 | 3 | 14 | 8 |

REFERENCE VALUE INFORMATION

FIG.7F

| 1 | 1 | 0 | 1 |
|---|---|---|---|
| 1 | 0 | 1 | 0 |
| 1 | 1 | 1 | 1 |
| 1 | 0 | 1 | 0 |

ACCUMULATIVE DOT INFORMATION (EXCLUSION INFORMATION)

FIG.7G

|  |  | 4 |  |
|---|---|---|---|
|  | 5 |  | 1 |
|  |  |  |  |
|  | 2 |  | 3 |

FIG.7H

| 16 | 6 | 4 | 15 |
|---|---|---|---|
| 7 | 5 | 12 | 1 |
| 10 | 11 | 8 | 9 |
| 13 | 2 | 14 | 3 |

EVALUATION VALUE INFORMATION

FIG.7I

DOT ARRANGEMENT DATA

FIG.7J

| 1 | 2 | 1 | 1 |
|---|---|---|---|
| 2 | 1 | 1 | 1 |
| 1 | 1 | 1 | 1 |
| 1 | 1 | 1 | 1 |

ACCUMULATIVE DOT INFORMATION (EXCLUSION INFORMATION) AFTER UPDATE

FIG.7K

| 0 | 1 | 1 | 0 |
|---|---|---|---|
| 1 | 1 | 0 | 1 |
| 0 | 0 | 0 | 0 |
| 0 | 1 | 0 | 1 |

QUANTIZED DATA

FIG.8A
DOT ARRANGEMENT DATA OF K
FIG.8B
| | | | |
|---|---|---|---|
| 0 | 0 | 0 | 4 |
| 0 | 4 | 0 | 0 |
| 4 | 0 | 4 | 4 |
| 0 | 0 | 0 | 0 |
EXCLUSION VALUE INFORMATION FOR C
FIG.8C
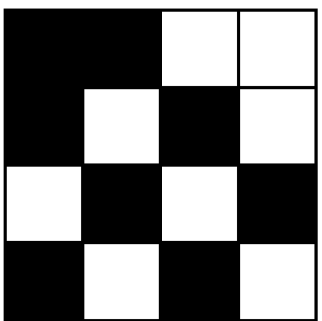
DOT ARRANGEMENT DATA OF C
FIG.8D
| | | | |
|---|---|---|---|
| 2 | 2 | 0 | 4 |
| 2 | 4 | 2 | 0 |
| 4 | 2 | 4 | 6 |
| 2 | 0 | 2 | 0 |
EXCLUSION VALUE INFORMATION FOR M
FIG.8E
| | | | |
|---|---|---|---|
| 10 | 3 | 14 | 8 |
| 5 | 15 | 1 | 12 |
| 2 | 7 | 4 | 9 |
| 6 | 13 | 11 | 16 |
REFERENCE VALUE INFORMATION OF M
FIG.8F
| | | | |
|---|---|---|---|
| 10 | 6 | 3 | 14 |
| 7 | 15 | 5 | 1 |
| 12 | 9 | 13 | 16 |
| 8 | 2 | 11 | 4 |
EVALUATION VALUE INFORMATION OF M
FIG.8G
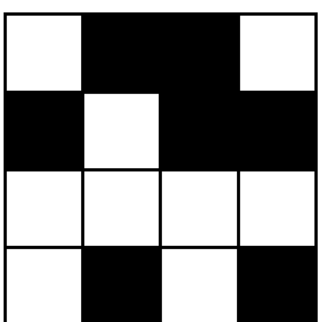
DOT ARRANGEMENT DATA OF M
FIG.8H
| | | | |
|---|---|---|---|
| 2 | 4 | 2 | 4 |
| 4 | 4 | 4 | 2 |
| 4 | 2 | 4 | 6 |
| 2 | 2 | 2 | 2 |
EXCLUSION VALUE INFORMATION FOR Y

GRADATION DATA

| 16 | 240 | 16 | 240 |
|---|---|---|---|
| 240 | 16 | 240 | 16 |
| 16 | 240 | 16 | 240 |
| 240 | 16 | 240 | 16 |

FIG.11A

GRADATION DATA (NORMALIZED)

| 0.063 | 0.941 | 0.063 | 0.941 |
|---|---|---|---|
| 0.941 | 0.063 | 0.941 | 0.063 |
| 0.063 | 0.941 | 0.063 | 0.941 |
| 0.941 | 0.063 | 0.941 | 0.063 |

FIG.11B

REFERENCE VALUE INFORMATION

| 3 | 133 | 118 | 241 |
|---|---|---|---|
| 76 | 212 | 31 | 146 |
| 216 | 17 | 172 | 40 |
| 153 | 98 | 56 | 184 |

FIG.11C

REFERENCE VALUE INFORMATION (NORMALIZED)

| 0.012 | 0.524 | 0.465 | 0.949 |
|---|---|---|---|
| 0.299 | 0.835 | 0.122 | 0.575 |
| 0.850 | 0.067 | 0.677 | 0.157 |
| 0.602 | 0.386 | 0.220 | 0.724 |

FIG.11D

EXCLUSION VALUE INFORMATION

| 0 | 0 | 0 | 0 |
|---|---|---|---|
| 0 | 0 | 0 | 0 |
| 0 | 0 | 0 | 0 |
| 0 | 0 | 0 | 0 |

FIG.11E

EXCLUSION CONTROL VALUE INFORMATION

| 0 | 0 | 0 | 0 |
|---|---|---|---|
| 0 | 0 | 0 | 0 |
| 0 | 0 | 0 | 0 |
| 0 | 0 | 0 | 0 |

FIG.11F

FIRST REFERENCE VALUE INFORMATION

| 0.051 | 0.417 | −0.402 | −0.008 |
|---|---|---|---|
| 0.642 | −0.772 | 0.819 | −0.512 |
| −0.787 | 0.874 | −0.614 | 0.784 |
| 0.339 | −0.323 | 0.721 | −0.661 |

FIG.11G

REFERENCE VALUE INFORMATION

| 8 | 6 | 11 | 9 |
|---|---|---|---|
| 5 | 15 | 2 | 12 |
| 16 | 1 | 13 | 3 |
| 7 | 10 | 4 | 14 |

FIG.11H

DOT ARRANGEMENT DATA

FIG.11I

QUANTIZED DATA

| 1 | 1 | 0 | 0 |
|---|---|---|---|
| 1 | 0 | 1 | 0 |
| 0 | 1 | 0 | 1 |
| 1 | 0 | 1 | 0 |

FIG.11J

GRADATION DATA

| 64 | 64 | 64 | 64 |
|---|---|---|---|
| 64 | 64 | 64 | 64 |
| 64 | 64 | 64 | 64 |
| 64 | 64 | 64 | 64 |

FIG.12A

GRADATION DATA (NORMALIZED)

| 0.251 | 0.251 | 0.251 | 0.251 |
|---|---|---|---|
| 0.251 | 0.251 | 0.251 | 0.251 |
| 0.251 | 0.251 | 0.251 | 0.251 |
| 0.251 | 0.251 | 0.251 | 0.251 |

FIG.12B

REFERENCE VALUE INFORMATION

| 131 | 2 | 241 | 101 |
|---|---|---|---|
| 215 | 79 | 164 | 13 |
| 108 | 140 | 55 | 179 |
| 37 | 230 | 188 | 64 |

FIG.12C

REFERENCE VALUE INFORMATION (NORMALIZED)

| 0.516 | 0.008 | 0.949 | 0.398 |
|---|---|---|---|
| 0.846 | 0.311 | 0.646 | 0.051 |
| 0.425 | 0.551 | 0.217 | 0.705 |
| 0.146 | 0.906 | 0.740 | 0.252 |

FIG.12D

EXCLUSION VALUE INFORMATION

| 4 | 4 | 0 | 0 |
|---|---|---|---|
| 4 | 0 | 4 | 0 |
| 0 | 4 | 0 | 4 |
| 4 | 0 | 4 | 0 |

FIG.12E

EXCLUSION CONTROL VALUE INFORMATION

| 1 | 1 | 0 | 0 |
|---|---|---|---|
| 1 | 0 | 1 | 0 |
| 0 | 1 | 0 | 1 |
| 1 | 0 | 1 | 0 |

FIG.12F

FIRST REFERENCE VALUE INFORMATION

| −1.265 | −0.757 | −0.698 | −0.147 |
|---|---|---|---|
| −1.595 | −0.060 | −1.395 | 0.200 |
| −0.174 | −1.300 | 0.034 | −1.454 |
| −0.895 | −0.655 | −1.489 | −0.001 |

FIG.12G

REFERENCE VALUE INFORMATION

| 11 | 9 | 8 | 5 |
|---|---|---|---|
| 16 | 4 | 13 | 1 |
| 6 | 12 | 2 | 14 |
| 10 | 7 | 15 | 3 |

FIG.12H

DOT ARRANGEMENT DATA

FIG.12I

QUANTIZED DATA

| 0 | 0 | 0 | 0 |
|---|---|---|---|
| 0 | 1 | 0 | 1 |
| 0 | 0 | 1 | 0 |
| 0 | 0 | 0 | 1 |

FIG.12J

GRADATION DATA

| 150 | 150 | 150 | 150 |
|---|---|---|---|
| 150 | 150 | 150 | 150 |
| 150 | 150 | 150 | 150 |
| 150 | 150 | 150 | 150 |

FIG.13A

GRADATION DATA (NORMALIZED)

| 0.588 | 0.588 | 0.588 | 0.588 |
|---|---|---|---|
| 0.588 | 0.588 | 0.588 | 0.588 |
| 0.588 | 0.588 | 0.588 | 0.588 |
| 0.588 | 0.588 | 0.588 | 0.588 |

FIG.13B

REFERENCE VALUE INFORMATION

| 245 | 23 | 144 | 192 |
|---|---|---|---|
| 64 | 119 | 124 | 80 |
| 159 | 228 | 7 | 169 |
| 26 | 41 | 202 | 89 |

FIG.13C

REFERENCE VALUE INFORMATION (NORMALIZED)

| 0.965 | 0.091 | 0.567 | 0.756 |
|---|---|---|---|
| 0.252 | 0.469 | 0.488 | 0.315 |
| 0.626 | 0.898 | 0.028 | 0.665 |
| 0.102 | 0.161 | 0.795 | 0.350 |

FIG.13D

EXCLUSION VALUE INFORMATION

| 4 | 4 | 0 | 0 |
|---|---|---|---|
| 4 | 2 | 4 | 2 |
| 0 | 4 | 2 | 4 |
| 4 | 0 | 4 | 2 |

FIG.13E

EXCLUSION CONTROL VALUE INFORMATION

| 1 | 1 | 0 | 0 |
|---|---|---|---|
| 1 | 0.5 | 1 | 0.5 |
| 0 | 1 | 0.5 | 1 |
| 1 | 0 | 1 | 0.5 |

FIG.13F

FIRST REFERENCE VALUE INFORMATION

| −1.377 | −0.503 | 0.021 | −0.168 |
|---|---|---|---|
| −0.664 | −0.381 | −0.900 | −0.227 |
| −0.038 | −1.310 | 0.060 | −1.077 |
| −0.514 | −0.427 | −1.207 | −0.262 |

FIG.13G

REFERENCE VALUE INFORMATION

| 16 | 9 | 3 | 5 |
|---|---|---|---|
| 11 | 8 | 12 | 6 |
| 4 | 15 | 2 | 13 |
| 10 | 1 | 14 | 7 |

FIG.13H

DOT ARRANGEMENT DATA

FIG.13I

QUANTIZED DATA

| 0 | 1 | 1 | 1 |
|---|---|---|---|
| 0 | 1 | 0 | 1 |
| 1 | 0 | 1 | 0 |
| 1 | 1 | 0 | 1 |

FIG.13J

GRADATION DATA

| | | | |
|---|---|---|---|
| 250 | 50 | 250 | 50 |
| 0 | 0 | 0 | 0 |
| 250 | 50 | 250 | 50 |
| 0 | 0 | 0 | 0 |

FIG.14A

GRADATION DATA (NORMALIZED)

| | | | |
|---|---|---|---|
| 0.980 | 0.196 | 0.980 | 0.196 |
| 0.000 | 0.000 | 0.000 | 0.000 |
| 0.980 | 0.196 | 0.980 | 0.196 |
| 0.000 | 0.000 | 0.000 | 0.000 |

FIG.14B

REFERENCE VALUE INFORMATION

| | | | |
|---|---|---|---|
| 130 | 217 | 60 | 174 |
| 33 | 31 | 254 | 184 |
| 149 | 206 | 119 | 52 |
| 0 | 97 | 9 | 152 |

FIG.14C

REFERENCE VALUE INFORMATION (NORMALIZED)

| | | | |
|---|---|---|---|
| 0.512 | 0.854 | 0.236 | 0.685 |
| 0.130 | 0.122 | 1.000 | 0.724 |
| 0.587 | 0.811 | 0.469 | 0.205 |
| 0.000 | 0.382 | 0.035 | 0.598 |

FIG.14D

EXCLUSION VALUE INFORMATION

| | | | |
|---|---|---|---|
| 4 | 8 | 4 | 4 |
| 4 | 6 | 4 | 6 |
| 4 | 4 | 6 | 4 |
| 4 | 4 | 4 | 6 |

FIG.14E

EXCLUSION CONTROL VALUE INFORMATION

| | | | |
|---|---|---|---|
| 0.5 | 1 | 0.5 | 0.5 |
| 0.5 | 0.75 | 0.5 | 0.75 |
| 0.5 | 0.5 | 0.75 | 0.5 |
| 0.5 | 0.5 | 0.5 | 0.75 |

FIG.14F

FIRST REFERENCE VALUE INFORMATION

| | | | |
|---|---|---|---|
| −0.032 | −1.658 | 0.244 | −0.989 |
| −0.630 | −0.872 | −1.500 | −1.474 |
| −0.107 | −1.115 | −0.239 | −0.509 |
| −0.500 | −0.882 | −0.535 | −1.348 |

FIG.14G

REFERENCE VALUE INFORMATION

| | | | |
|---|---|---|---|
| 2 | 16 | 1 | 11 |
| 8 | 9 | 15 | 14 |
| 3 | 12 | 4 | 6 |
| 5 | 10 | 7 | 13 |

FIG.14H

DOT ARRANGEMENT DATA

FIG.14I

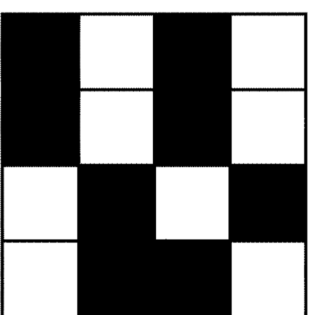
FIG.15A
| | | | |
|---|---|---|---|
| 15 | 241 | 2 | 130 |
| 215 | 79 | 200 | 13 |
| 70 | 251 | 8 | 179 |
| 30 | 230 | 188 | 0 |
FIG.15B
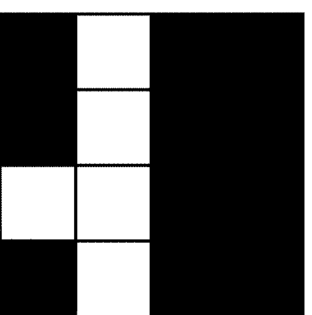
FIG.15C
| | | | |
|---|---|---|---|
| 0.004 | −0.008 | 0.055 | 0.429 |
| 0.095 | −0.248 | 0.154 | 0.012 |
| −0.213 | −0.047 | 0.032 | 0.236 |
| 0.823 | −0.843 | 0.201 | 0.063 |
FIG.15D
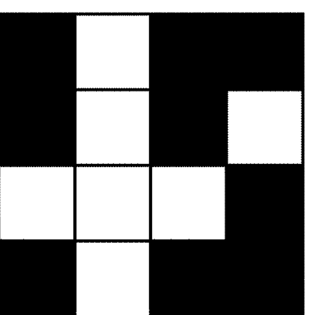
FIG.15E

| −0.265 | 0.243 | −0.698 | −0.147 |
|---|---|---|---|
| −0.595 | −0.060 | −0.395 | 0.200 |
| −0.174 | −0.300 | 0.034 | −0.454 |
| 0.105 | −0.655 | −0.489 | −0.001 |

GRADATION DATA

| 64 | 64 | 64 | 64 |
|---|---|---|---|
| 64 | 64 | 64 | 64 |
| 64 | 64 | 64 | 64 |
| 64 | 64 | 64 | 64 |

THRESHOLD MATRIX AFTER SHIFT

| 242 | 148 | 102 | 1 |
|---|---|---|---|
| 91 | 196 | 46 | 130 |
| 200 | 32 | 156 | 55 |
| 168 | 82 | 71 | 168 |

DOT ARRANGEMENT DATA

| | | | | | | | |
|---|---|---|---|---|---|---|---|
| 254 | 26 | 134 | 241 | 201 | 41 | 219 | 68 |
| 53 | 213 | 179 | 4 | 120 | 100 | 140 | 176 |
| 105 | 154 | 68 | 90 | 228 | 28 | 250 | 85 |
| 188 | 31 | 221 | 130 | 171 | 59 | 191 | 8 |
| 244 | 114 | 46 | 196 | 19 | 146 | 210 | 112 |
| 12 | 161 | 231 | 79 | 247 | 98 | 67 | 233 |
| 183 | 57 | 137 | 6 | 119 | 165 | 37 | 185 |
| 251 | 87 | 203 | 177 | 51 | 219 | 138 | 80 |
| 211 | 17 | 152 | 93 | 239 | 23 | 195 | 108 |
| 106 | 73 | 224 | 39 | 131 | 70 | 150 | 2 |
| 187 | 30 | 175 | 116 | 207 | 182 | 245 | 86 |
| 232 | 144 | 251 | 58 | 11 | 100 | 45 | 164 |

| | | |
|---|---|---|
| 8 | 250 | 142 |
| 182 | 72 | 62 |
| 4 | 13 | 45 |

FIG.22A

| | | |
|---|---|---|
| 80 | 128 | 211 |
| 108 | 14 | 89 |
| 62 | 131 | 100 |

FIG.22B

| | | |
|---|---|---|
| 168 | 126 | 84 |
| 188 | 85 | 152 |
| 106 | 103 | 135 |

FIG.22C

| | | |
|---|---|---|
| 256 | 504 | 437 |
| 478 | 171 | 303 |
| 172 | 247 | 280 |

FIG.22D

| | | | | |
|---|---|---|---|---|
| 16 | 150 | 64 | 64 | 64 |
| 16 | 150 | 64 | 64 | 64 |
| 16 | 150 | 64 | 64 | 64 |
| 16 | 150 | 64 | 64 | 64 |
| 16 | 150 | 64 | 64 | 64 |

GRADATION DATA OF K INK

| | | | | |
|---|---|---|---|---|
| 254 | 26 | 134 | 241 | 201 |
| 53 | 213 | 179 | 4 | 120 |
| 105 | 154 | 68 | 90 | 228 |
| 188 | 31 | 221 | 130 | 171 |
| 244 | 114 | 46 | 196 | 19 |

THRESHOLDS

QUANTIZED DATA OF K INK

| | | | | |
|---|---|---|---|---|
| 238 | -124 | 70 | 177 | 137 |
| 37 | 63 | 115 | -60 | 56 |
| 89 | 4 | 4 | 26 | 164 |
| 172 | -119 | 157 | 66 | 107 |
| 228 | -36 | -18 | 132 | -45 |

THRESHOLDS AFTER EXCLUSION PROCESSING

| | | | | |
|---|---|---|---|---|
| 0.81 | 0.81 | 0.40 | 0.00 | 0.00 |
| 0.81 | 0.81 | 0.40 | 0.00 | 0.00 |
| 0.81 | 0.81 | 0.40 | 0.00 | 0.00 |
| 0.81 | 0.81 | 0.40 | 0.00 | 0.00 |
| 0.81 | 0.81 | 0.40 | 0.00 | 0.00 |

cnt

| | | | | |
|---|---|---|---|---|
| 250.9 | 252.1 | 95.7 | 177.0 | 137.0 |
| 49.9 | 184.1 | 140.7 | 195.0 | 56.0 |
| 101.9 | 125.1 | 29.7 | 26.0 | 164.0 |
| 184.9 | 2.1 | 182.7 | 66.0 | 107.0 |
| 240.9 | 85.1 | 7.7 | 132.0 | 210.0 |

THRESHOLDS AFTER EXCLUSION CONTROL

| 225 | 93 | 207 | 109 |
|---|---|---|---|
| 20 | 72 | 22 | 98 |
| 79 | 7 | 68 | 229 |
| 100 | 159 | 182 | 86 |

| 254 | 26 | 134 | 241 | 201 | 41 | 219 | 68 |
|---|---|---|---|---|---|---|---|
| 53 | 213 | 179 | 4 | 120 | 100 | 140 | 176 |
| 105 | 154 | 68 | 90 | 228 | 28 | 250 | 85 |
| 188 | 31 | 221 | 130 | 171 | 59 | 191 | 8 |
| 244 | 114 | 46 | 196 | 19 | 146 | 210 | 112 |
| 12 | 161 | 231 | 79 | 247 | 98 | 67 | 233 |
| 183 | 57 | 137 | 6 | 119 | 165 | 37 | 185 |
| 251 | 87 | 203 | 177 | 51 | 219 | 138 | 80 |
| 211 | 17 | 152 | 93 | 239 | 23 | 195 | 108 |
| 106 | 73 | 224 | 39 | 131 | 70 | 150 | 2 |
| 187 | 30 | 175 | 116 | 207 | 182 | 245 | 86 |
| 232 | 144 | 251 | 58 | 11 | 100 | 45 | 164 |

...

| 0 | 1 | 1 | 0 |
|---|---|---|---|
| 1 | 1 | 0 | 1 |
| 0 | 0 | 0 | 0 |
| 0 | 1 | 0 | 1 |

GRADATION DATA

| 16 | 192 | 16 | 16 |
|---|---|---|---|
| 16 | 192 | 16 | 16 |
| 16 | 192 | 16 | 16 |
| 16 | 192 | 16 | 16 |

FIG.28A

THRESHOLD

| 146 | 133 | 118 | 241 |
|---|---|---|---|
| 76 | 212 | 31 | 3 |
| 216 | 17 | 172 | 40 |
| 153 | 98 | 61 | 184 |

FIG.28B

EVALUATION VALUE E

| -0.512 | 0.229 | -0.402 | -0.886 |
|---|---|---|---|
| -0.236 | -0.082 | -0.059 | 0.051 |
| -0.787 | 0.686 | -0.614 | -0.094 |
| -0.539 | 0.367 | -0.177 | -0.661 |

FIG.28C

EXCLUSION CONTROL VALUE H

| 0 | 0 | 0 | 0 |
|---|---|---|---|
| 0 | 0 | 0 | 0 |
| 0 | 0 | 0 | 0 |
| 0 | 0 | 0 | 0 |

FIG.28D

EVALUATION VALUE E'

| -0.512 | 0.229 | -0.402 | -0.886 |
|---|---|---|---|
| -0.236 | -0.082 | -0.059 | 0.051 |
| -0.787 | 0.686 | -0.614 | -0.094 |
| -0.539 | 0.367 | -0.177 | -0.661 |

FIG.28E

ACCUMULATIVE TONAL DATA S

| 0 | 0 | 0 | 0 |
|---|---|---|---|
| 0 | 0 | 0 | 0 |
| 0 | 0 | 0 | 0 |
| 0 | 0 | 0 | 0 |

FIG.28F

EVALUATION VALUE E"

| -0.512 | 0.229 | -0.402 | -0.886 |
|---|---|---|---|
| -0.236 | -0.082 | -0.059 | 0.051 |
| -0.787 | 0.686 | -0.614 | -0.094 |
| -0.539 | 0.367 | -0.177 | -0.661 |

FIG.28G

DOT ARRANGEMENT

FIG.28H

QUANTIZED DATA

| 0 | 1 | 0 | 0 |
|---|---|---|---|
| 0 | 0 | 0 | 1 |
| 0 | 1 | 0 | 0 |
| 0 | 1 | 0 | 0 |

FIG.28I

GRADATION DATA

| 16 | 192 | 16 | 16 |
|---|---|---|---|
| 16 | 192 | 16 | 16 |
| 16 | 192 | 16 | 16 |
| 16 | 192 | 16 | 16 |

FIG.29A

THRESHOLD

| 131 | 2 | 241 | 101 |
|---|---|---|---|
| 215 | 79 | 164 | 13 |
| 108 | 140 | 55 | 179 |
| 37 | 230 | 188 | 64 |

FIG.29B

DOT ARRANGEMENT EVALUATION VALUE E

| -0.453 | 0.745 | -0.886 | -0.335 |
|---|---|---|---|
| -0.783 | 0.442 | -0.583 | 0.012 |
| -0.362 | 0.202 | -0.154 | -0.642 |
| -0.083 | -0.153 | -0.677 | -0.189 |

FIG.29C

EXCLUSION CONTROL VALUE H

| 0 | 4 | 0 | 0 |
|---|---|---|---|
| 0 | 0 | 0 | 4 |
| 0 | 4 | 0 | 0 |
| 0 | 4 | 0 | 0 |

FIG.29D

DOT ARRANGEMENT EVALUATION VALUE E'

| -0.453 | -0.255 | -0.886 | -0.335 |
|---|---|---|---|
| -0.783 | 0.442 | -0.583 | -0.988 |
| -0.362 | -0.798 | -0.154 | -0.642 |
| -0.083 | -1.153 | -0.677 | -0.189 |

FIG.29E

ACCUMULATIVE TONAL DATA S

| 64 | 768 | 64 | 64 |
|---|---|---|---|
| 64 | 768 | 64 | 64 |
| 64 | 768 | 64 | 64 |
| 64 | 768 | 64 | 64 |

FIG.29F

DOT ARRANGEMENT EVALUATION VALUE E"

| -0.39 | 0.498 | -0.823 | -0.272 |
|---|---|---|---|
| -0.72 | 1.195 | -0.52 | -0.925 |
| -0.299 | -0.045 | -0.091 | -0.579 |
| -0.02 | -0.4 | -0.614 | -0.126 |

FIG.29G

DOT ARRANGEMENT

FIG.29H

QUANTIZED DATA

| 0 | 1 | 0 | 0 |
|---|---|---|---|
| 0 | 1 | 0 | 0 |
| 0 | 1 | 0 | 0 |
| 1 | 0 | 0 | 0 |

FIG.29I

| GRADATION DATA | | | |
|---|---|---|---|
| 16 | 192 | 16 | 16 |
| 16 | 192 | 16 | 16 |
| 16 | 192 | 16 | 16 |
| 16 | 192 | 16 | 16 |

FIG.30A

| THRESHOLD | | | |
|---|---|---|---|
| 245 | 23 | 144 | 192 |
| 64 | 119 | 124 | 80 |
| 159 | 228 | 7 | 169 |
| 26 | 41 | 202 | 89 |

FIG.30B

| DOT ARRANGEMENT EVALUATION VALUE E | | | |
|---|---|---|---|
| -0.902 | 0.662 | -0.504 | -0.693 |
| -0.189 | 0.284 | -0.425 | -0.252 |
| -0.563 | -0.145 | 0.035 | -0.602 |
| -0.039 | 0.592 | -0.732 | -0.287 |

FIG.30C

| EXCLUSION CONTROL VALUE H | | | |
|---|---|---|---|
| 0 | 6 | 0 | 0 |
| 0 | 2 | 0 | 4 |
| 0 | 6 | 0 | 0 |
| 2 | 4 | 0 | 0 |

FIG.30D

| DOT ARRANGEMENT EVALUATION VALUE E' | | | |
|---|---|---|---|
| -0.902 | -0.338 | -0.504 | -0.693 |
| -0.189 | -0.049 | -0.425 | -0.919 |
| -0.563 | -1.145 | 0.035 | -0.602 |
| -0.372 | -0.075 | -0.732 | -0.287 |

FIG.30E

| ACCUMULATIVE TONAL DATA S | | | |
|---|---|---|---|
| 96 | 1152 | 96 | 96 |
| 96 | 1152 | 96 | 96 |
| 96 | 1152 | 96 | 96 |
| 96 | 1152 | 96 | 96 |

FIG.30F

| DOT ARRANGEMENT EVALUATION VALUE E" | | | |
|---|---|---|---|
| -0.839 | 0.415 | -0.441 | -0.63 |
| -0.126 | 0.704 | -0.362 | -0.856 |
| -0.5 | -0.392 | 0.098 | -0.539 |
| -0.309 | 0.678 | -0.669 | -0.224 |

FIG.30G

| DOT ARRANGEMENT | | | |
|---|---|---|---|
| | ■ | | |
| | ■ | | |
| | | ■ | |
| | ■ | | |

FIG.30H

| QUANTIZED DATA | | | |
|---|---|---|---|
| 0 | 1 | 0 | 0 |
| 0 | 1 | 0 | 0 |
| 0 | 0 | 1 | 0 |
| 0 | 1 | 0 | 0 |

FIG.30I

GRADATION DATA

| | | | |
|---|---|---|---|
| 16 | 192 | 16 | 16 |
| 16 | 192 | 16 | 16 |
| 16 | 192 | 16 | 16 |
| 16 | 192 | 16 | 16 |

FIG.31A

THRESHOLD

| | | | |
|---|---|---|---|
| 130 | 217 | 86 | 174 |
| 95 | 31 | 254 | 184 |
| 149 | 206 | 119 | 52 |
| 0 | 167 | 9 | 152 |

FIG.31B

DOT ARRANGEMENT EVALUATION VALUE E

| | | | |
|---|---|---|---|
| -0.902 | 0.662 | -0.504 | -0.693 |
| -0.189 | 0.284 | -0.425 | -0.252 |
| -0.563 | -0.145 | 0.035 | -0.602 |
| -0.039 | 0.592 | -0.732 | -0.287 |

FIG.31C

EXCLUSION CONTROL VALUE H

| | | | |
|---|---|---|---|
| 0 | 8 | 0 | 0 |
| 0 | 4 | 0 | 4 |
| 0 | 6 | 2 | 0 |
| 2 | 6 | 0 | 0 |

FIG.31D

DOT ARRANGEMENT EVALUATION VALUE E'

| | | | |
|---|---|---|---|
| -0.449 | -1.101 | -0.276 | -0.622 |
| -0.311 | 0.131 | -0.937 | -1.161 |
| -0.524 | -0.808 | -0.656 | -0.142 |
| -0.187 | -0.654 | 0.028 | -0.535 |

FIG.31E

ACCUMULATIVE TONAL DATA S

| | | | |
|---|---|---|---|
| 128 | 1536 | 128 | 128 |
| 128 | 1536 | 128 | 128 |
| 128 | 1536 | 128 | 128 |
| 128 | 1536 | 128 | 128 |

FIG.31F

DOT ARRANGEMENT EVALUATION VALUE E"

| | | | |
|---|---|---|---|
| -0.386 | -0.348 | -0.213 | -0.559 |
| -0.248 | 0.884 | -0.874 | -1.098 |
| -0.461 | -0.055 | -0.593 | -0.079 |
| -0.124 | 0.099 | 0.091 | -0.472 |

FIG.31G

DOT ARRANGEMENT

FIG.31H

QUANTIZED DATA

| | | | |
|---|---|---|---|
| 0 | 0 | 0 | 0 |
| 0 | 1 | 0 | 0 |
| 0 | 1 | 0 | 0 |
| 0 | 1 | 1 | 0 |

FIG.31I

IMAGE PROCESSING APPARATUS, IMAGE PROCESSING METHOD, AND STORAGE MEDIUM FOR GENERATING QUANTIZED DATA FOR FORMING AN IMAGE ON A PRINT MEDIUM

BACKGROUND OF THE INVENTION

Field of the Invention

The present invention relates to an image processing apparatus, an image processing method, and a storage medium that generate quantized data for forming an image on a print medium.

Description of the Related Art

A dither method is known as a quantization method for printing an image by using a pseudo gradation method. The dither method uses a dither matrix in which thresholds associated with individual pixels are arrayed, and determines whether or not to perform dot printing for each pixel by comparing the associated threshold with a pixel value indicated by image data.

International Publication No. WO 2002/005545 discloses a dither method of using a common dither matrix for pieces of image data for multiple kinds of colorants used in a printing apparatus while correcting the dither matrix. Specifically, quantization processing on image data of a color processed first is performed by directly using thresholds stored in the dither matrix. Then, quantization processing on image data of a color subsequently processed is performed by using thresholds obtained by correcting the thresholds stored in the dither matrix based on the image data of the color processed first.

Japanese Patent Laid-Open No. 2014-739 discloses a quantization method that employs the dither method and also provides an upper limit to the number in an overlapping manner or size of dots to be printed on the same pixel and changes, for a pixel exceeding the upper limit, the pixel values of its surrounding pixels based on the difference from the upper limit.

According to International Publication No. WO 2002/005545 and Japanese Patent Laid-Open No. 2014-739, it is possible to reduce the frequency at which dots of different colors are printed at the same position on a print medium in an overlapping manner, thereby reducing color development defect due to dot overlapping.

However, in the case of International Publication No. WO 2002/005545, when a characteristic pattern is included in image data of a color on which the processing is performed first, interference between the image data and the threshold matrix affects dot arrangement in a color on which the processing is subsequently performed, and degrades the granularity of the whole image in some cases. In addition, when dots of different colors are formed in a manner exclusive from each other in a region, such as an edge part of the image, in which the pixel value abruptly changes, dots of a color having higher priority are likely to concentrate at the edge part. As a result, dots of a color having lower priority are arranged around the edge part, which causes sharpness decrease, local coloring, and the like in some cases.

In the case of Japanese Patent Laid-Open No. 2014-739, it is possible to reduce the frequency at which dots of different colors are arranged at the same pixel in an overlapping manner, but the difference generated at the pixel is distributed to its surrounding pixels, and thus dots are highly likely to be arranged at the surrounding pixels. As a result, the granularity is lost in some cases.

In sum, according to International Publication No. WO 2002/005545 and Japanese Patent Laid-Open No. 2014-739, it is possible to reduce color development defect due to dot overlapping, but it is difficult to stably output an image with reduced texture and granularity and excellent sharpness.

SUMMARY OF THE INVENTION

The present invention is intended to solve the above-described problem. Thus, it is an object of the present invention to provide quantization processing that can reduce color development defect due to dot overlapping and can output an image with reduced granularity and excellent sharpness when the image is printed by using multiple kinds of colorants.

In a first aspect of the present invention, there is provided an image processing apparatus that determines dot arrangement for each of a plurality of kinds of colorants based on an image for the colorant, the image processing apparatus comprising: an acquisition unit configured to acquire, for a predetermined region of the image, arrangement information of dots of a colorant of a first color for which dot arrangement is already determined among the plurality of kinds of colorants; a target value derivation unit configured to derive, based on a pixel value in the predetermined region of the image for a second color for which dot arrangement is yet to be determined among the plurality of kinds of colorants, a target value for a colorant of the second color in the predetermined region; an evaluation value derivation unit configured to derive an evaluation value for the colorant of the second color at each pixel included in the predetermined region based on the arrangement information; and a dot arrangement determination unit configured to determine dot arrangement for the colorant of the second color in the predetermined region based on the target value and the evaluation value.

In a second aspect of the present invention, there is provided an image processing method for determining dot arrangement for each of a plurality of kinds of colorants based on an image for the colorant, the image processing method comprising: acquiring, for a predetermined region of the image, arrangement information of dots of a colorant of a first color for which dot arrangement is already determined among the plurality of kinds of colorants; deriving, based on a pixel value in the predetermined region of the image for a second color for which dot arrangement is yet to be determined among the plurality of kinds of colorants, a target value for a colorant of the second color in the predetermined region; deriving an evaluation value for the colorant of the second color at each pixel included in the predetermined region based on the arrangement information; and determining dot arrangement for the colorant of the second color in the predetermined region based on the target value and the evaluation value.

In a third aspect of the present invention, there is provided a non-transitory computer readable storage medium storing a program for causing a computer to function as each unit of an image processing apparatus that determines dot arrangement for each of a plurality of kinds of colorants based on an image for the colorant, the image processing apparatus comprising: an acquisition unit configured to acquire, for a predetermined region of the image, arrangement information of dots of a colorant of a first color for which dot arrangement is already determined among the plurality of kinds of colorants; a target value derivation unit configured to derive, based on a pixel value in the predetermined region of the image for a second color for which dot arrangement is yet to be determined among the plurality of kinds of colorants, a target value for a colorant of the second color in the predetermined region; an evaluation value derivation unit configured to derive an evaluation value for the colorant of the second color at each pixel included in the predetermined region based on the arrangement information; and a dot arrangement determination unit configured to determine dot arrangement for the colorant of the second color in the predetermined region based on the target value and the evaluation value.

In a fourth aspect of the present invention, there is provided an image processing apparatus that determines dot arrangement for each of a plurality of kinds of colorants by using a threshold matrix based on an image for the colorant, the image processing apparatus comprising: an acquisition unit configured to acquire an output value at an interest pixel for a first color for which dot arrangement is determined among the plurality of kinds of colorants; a calculation unit configured to calculate an exclusion control value for controlling a degree of dot exclusion at the interest pixel for a second color for which dot arrangement is yet to be determined among the plurality of kinds of colorants based on the output value at the interest pixel for the first color and a pixel value of the first color at the interest pixel; and a determination unit configured to determine an output value for the second color at the interest pixel based on a pixel value of the second color at the interest pixel, the exclusion control value, and the threshold matrix.

In a fifth aspect of the present invention, there is provided an image processing method for determining dot arrangement for each of a plurality of kinds of colorants by using a threshold matrix based on an image for the colorant, the image processing method comprising: acquiring an output value at an interest pixel for a first color for which dot arrangement is determined among the plurality of kinds of colorants; calculating an exclusion control value for controlling a degree of dot exclusion at the interest pixel for a second color for which dot arrangement is yet to be determined among the plurality of kinds of colorants based on the output value for the first color at the interest pixel and a pixel value of the first color at the interest pixel; and determining an output value for the second color at the interest pixel based on a pixel value of the second color at the interest pixel, the exclusion control value, and the threshold matrix.

In a sixth aspect of the present invention, there is provided a non-transitory computer readable storage medium storing a program for causing a computer to function as each unit of an image processing apparatus that determines dot arrangement for each of a plurality of kinds of colorants by using a threshold matrix based on an image for the colorant, the image processing apparatus comprising: an acquisition unit configured to acquire an output value at an interest pixel for a first color for which dot arrangement is determined among the plurality of kinds of colorants; a calculation unit configured to calculate an exclusion control value for controlling a degree of dot exclusion at the interest pixel for a second color for which dot arrangement is yet to be determined among the plurality of kinds of colorants based on the output value at the interest pixel for the first color and a pixel value of the first color at the interest pixel; and a determination unit configured to determine an output value for the second color at the interest pixel based on a pixel value of the second color at the interest pixel, the exclusion control value, and the threshold matrix.

Further features of the present invention will become apparent from the following description of exemplary embodiments with reference to the attached drawings.

BRIEF DESCRIPTION OF THE DRAWINGS

FIGS. 7A to 7K are diagrams illustrating steps of the quantization processing of the first embodiment;

FIGS. 8A to 8H are diagrams illustrating steps of quantization processing of a second embodiment;

FIGS. 11A to 11J are diagrams illustrating steps of quantization processing for a first color;

FIGS. 12A to 12J are diagrams illustrating steps of quantization processing for a second color;

FIGS. 13A to 13J are diagrams illustrating steps of quantization processing for a third color;

FIGS. 14A to 141 are diagrams illustrating steps of quantization processing for a fourth color;

FIGS. 15A to 15E are comparison diagrams for description of effects of the third embodiment;

FIG. 20 is a diagram illustrating an exemplary threshold matrix;

FIGS. 22A to 22D are diagrams illustrating exemplary gradation data Ik, Ic, and Im;

FIGS. 28A to 28I are diagrams illustrating exemplary K-ink quantization processing;

FIGS. 29A to 29I are diagrams illustrating exemplary C-ink quantization processing;

FIGS. 30A to 30I are diagrams illustrating exemplary M-ink quantization processing;

FIGS. 31A to 31I are diagrams illustrating exemplary Y-ink quantization processing.

DESCRIPTION OF THE EMBODIMENTS

Preferable embodiments of the present invention will be described below with reference to the accompanying drawings. Configurations described in the following embodiments are merely exemplary, and the present invention is not necessarily limited to the described configurations.

First Embodiment

Figures 1A, 1B:
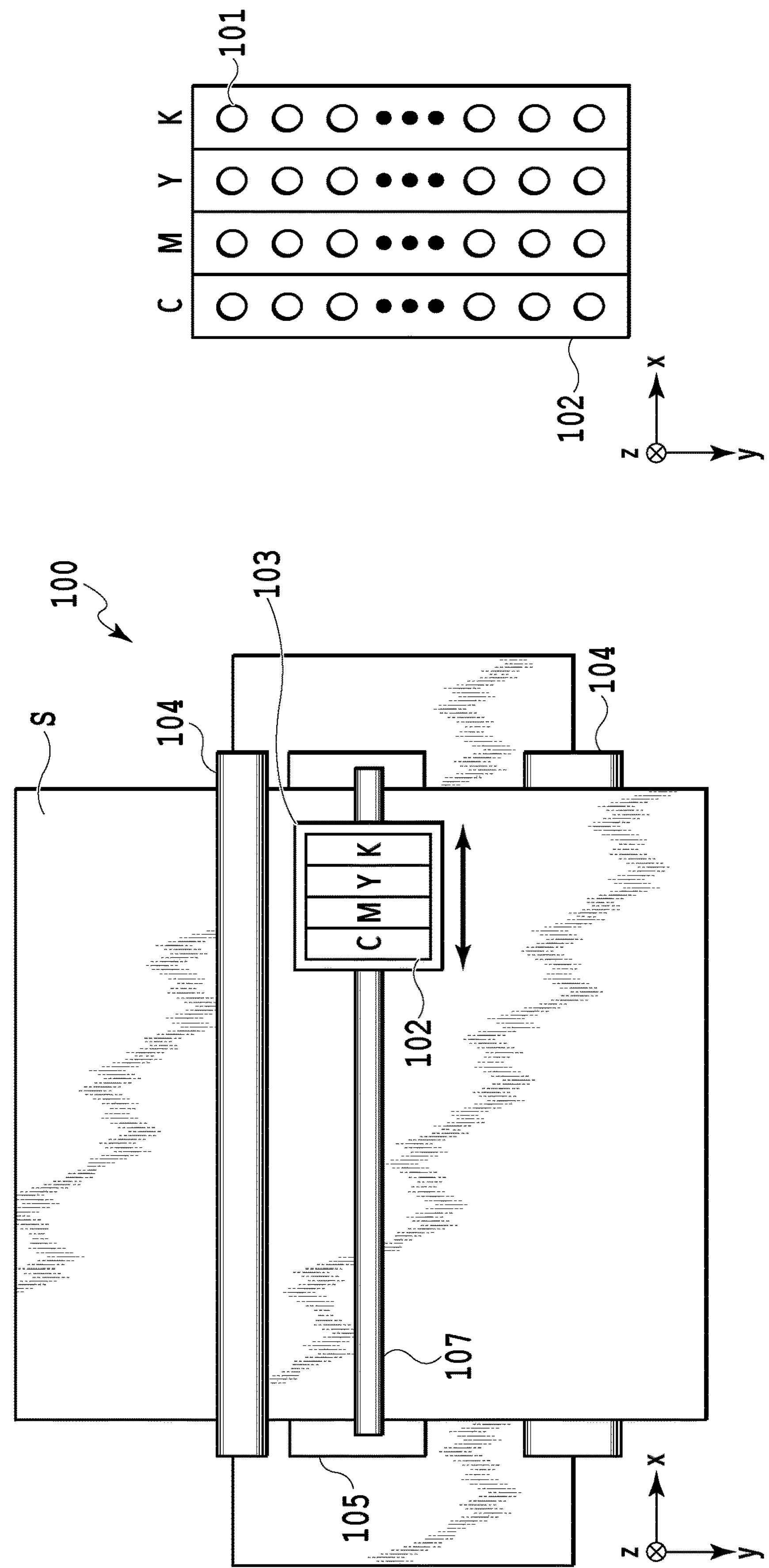
FIGS. 1A and 1B are schematic views of a printing apparatus and a printing head.

FIGS. 1A and 1B are schematic views of a printing apparatus 100 and a printing head 102 used in the present embodiment. The printing apparatus 100 used in the present embodiment is a serial ink-jet printing apparatus. In FIGS. 1A and 1B, an x direction represents the main scanning direction of the printing head, a y direction represents the conveyance direction of a print medium S, and a z direction represents the direction of ink discharge.

As illustrated in FIG. 1B, in the printing head 102, nozzle arrays configured to discharge ink of cyan (C), magenta (M), yellow (Y), and black (K), respectively, are arranged in parallel to each other in the x direction. In each nozzle array, multiple nozzles 101 configured to discharge ink in the z direction in accordance with print data are arrayed in the y direction.

As illustrated in FIG. 1A, the printing head 102 is mounted on a carriage 103, and the carriage 103 is movable in the positive and negative x directions along a carriage shaft 107. An image of one band is printed on the print medium S as the printing head 102 discharges ink from the nozzles 101 in accordance with print data while the carriage 103 moves in the positive and negative x directions. A platen 105 made of a flat plate is arranged at a position facing a nozzle plane of the printing head 102. The platen 105 supports, from the back surface, the print medium S in a region printed by the printing head 102, thereby maintaining a constant distance between the nozzle plane of the printing head 102 and the print medium S.

When print scanning of one band by the printing head 102 is completed, two pairs of conveyance rollers 104 sandwiching the print medium S rotate to convey the print medium in the positive y direction by a distance corresponding to the above-described one band. As the print scanning of one band by the printing head 102 and the conveyance operation of the print medium S by the conveyance rollers 104 as described above are alternately repeated, an image is formed on the print medium S at stages.

Figure 2:
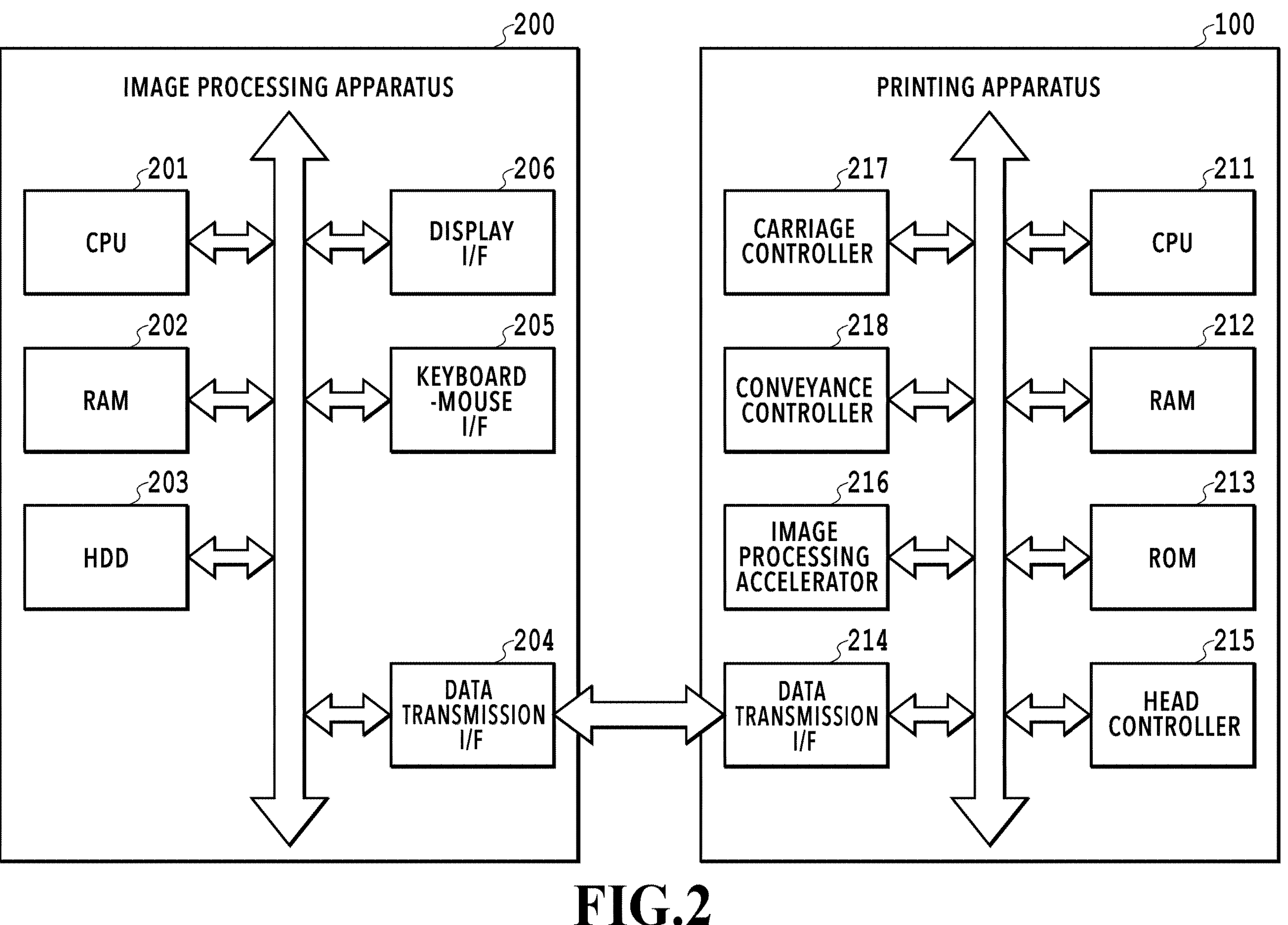
FIG. 2 is a block diagram for description of a control configuration.

FIG. 2 is a block diagram for description of a control configuration in the present embodiment. An image processing apparatus 200 is achieved by a host PC or the like, and a CPU 201 executes various kinds of processing by using a RAM 202, which is a transitory storage unit, as a work area in accordance with a computer program held in a HDD 203, which is a non-transitory storage unit. For example, the CPU 201 generates print data printable by the printing apparatus 100 in accordance with a command received from a user through a keyboard-mouse I/F 205 and a computer program held in the HDD 203, and outputs the generated print data to the printing apparatus 100. In addition, information received from the printing apparatus 100 through a data transmission I/F 204 is displayed on a display (not illustrated) through a display I/F 206.

In the printing apparatus 100, a CPU 211 executes various kinds of processing by using a RAM 212, which is a transitory storage unit, as a work area in accordance with a computer program held in a ROM 213, which is a non-transitory storage unit. Furthermore, the printing apparatus 100 includes an image processing accelerator 216 for performing fast image processing, and a head controller 215 for controlling the printing head 102.

The image processing accelerator 216 is hardware capable of executing image processing faster than the CPU 211. The image processing accelerator 216 is activated by writing parameters and data necessary for image processing by the CPU 211 to a predetermined address of the RAM 212, reads the above-described parameters and data, and then executes predetermined image processing on the above-described data. However, the image processing accelerator 216 is not an essential element, but the CPU 211 may execute equivalent processing.

The head controller 215 supplies print data to the printing head 102 and controls a print operation by the printing head 102. The head controller 215 is activated when the CPU 211 writes print data printable by the printing head 102 and control parameters to a predetermined address of the RAM 212, and executes a discharge operation in accordance with the print data.

A carriage controller 217 controls movement of the carriage 103 in the positive and negative x directions in accordance with an instruction from the CPU 211. In addition, a conveyance controller 218 controls rotation of the conveyance rollers 104, in other words, conveyance of the print medium S in accordance with an instruction from the CPU 211.

USB, IEEE1394, LAN, or the like may be used as a connection scheme at the data transmission I/F 204 of the image processing apparatus 200 and a data transmission I/F 214 of the printing apparatus 100.

Figure 3:
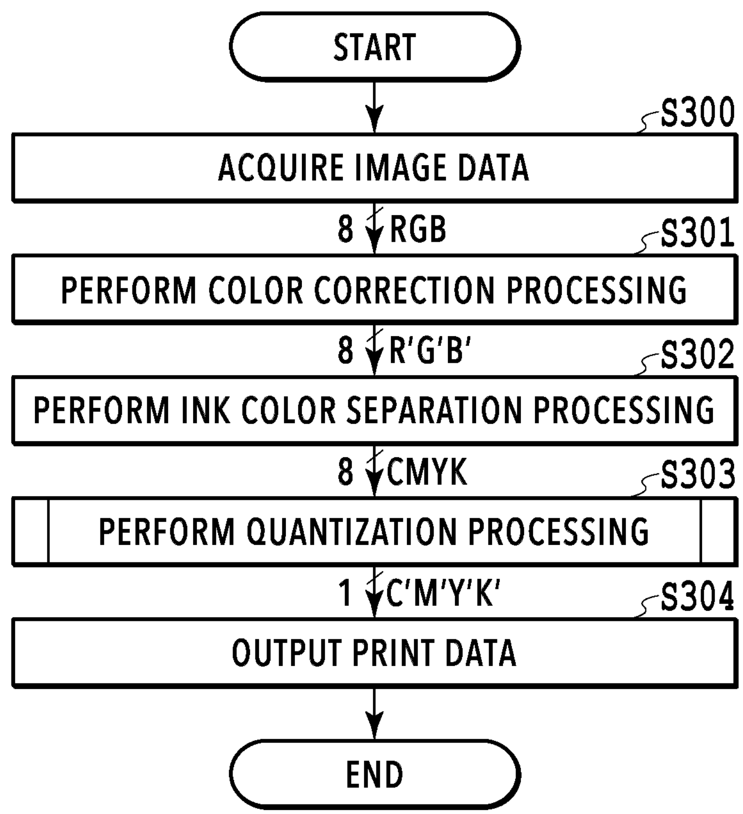
FIG. 3 is a flowchart for description of the process of image processing.

FIG. 3 is a flowchart for description of the process of image processing executed by the CPU 201 of the image processing apparatus 200 when a printing command is generated. The present processing is executed by the CPU 201 by using the RAM 202 as a work area in accordance with a computer program stored in the HDD 203.

When the present processing is started, the CPU 201 first acquires image data produced by an application program or the like, and loads the acquired image data onto the RAM 202. In the present embodiment, image data having an 8-bit (256-tone) pixel value indicating luminance of each of red (R), green (G), and blue (B) is acquired for each pixel. Hereinafter, such image data including a pixel having pixel values of multiple components such as R, G, and B is referred to as RGB data by using the components.

At S301, the CPU 201 executes color correction processing on the image data loaded on the RAM 202. The color correction processing is processing for converting image data expressing a standard color space such as sRGB into image data associated with color space printable by the printing apparatus 100. Specifically, the CPU 201 refers to an RGB three-dimensional look-up table stored in advance and converts RGB data including an 8-bit (256-tone) pixel value into R'G'B' data including an 8-bit (256-tone) pixel value.

At S302, the CPU 201 executes color conversion processing on the R'G'B' data generated at S301. The color conversion processing is processing for converting R'G'B' data indicating luminance information into data indicating density information of K, C, M, and Y for ink colors used by the printing apparatus 100. Specifically, the CPU 201 refers to the three-dimensional look-up table stored in advance and converts 8-bit (256-tone) R'G'B' data of each pixel into 8-bit (256-tone) KCMY data. Data for the ink colors obtained by the color conversion processing is collectively referred to as KCMY data.

At S303, the CPU 201 performs quantization processing on the KCMY data generated at S302. Through the quantization processing, which will be described in detail later, the 8-bit (256-tone) KCMY data is converted into 1-bit K'C'M'Y' data. In the present embodiment, K'C'M'Y' data is binary data that specifies dot printing (1) or no dot printing (0) for each pixel for KCMY ink colors.

At S304, the CPU 201 outputs the K'C'M'Y' data generated at S303 to the printing apparatus 100 as print data. Accordingly, the present processing ends.

Having received the print data, the CPU 211 of the printing apparatus 100 loads the print data onto the RAM 212. Then, while controlling the head controller 215, the carriage controller 217, and the conveyance controller 218, the CPU 211 prints an image on a print medium in accordance with the print data loaded on the RAM 212.

Figure 4:
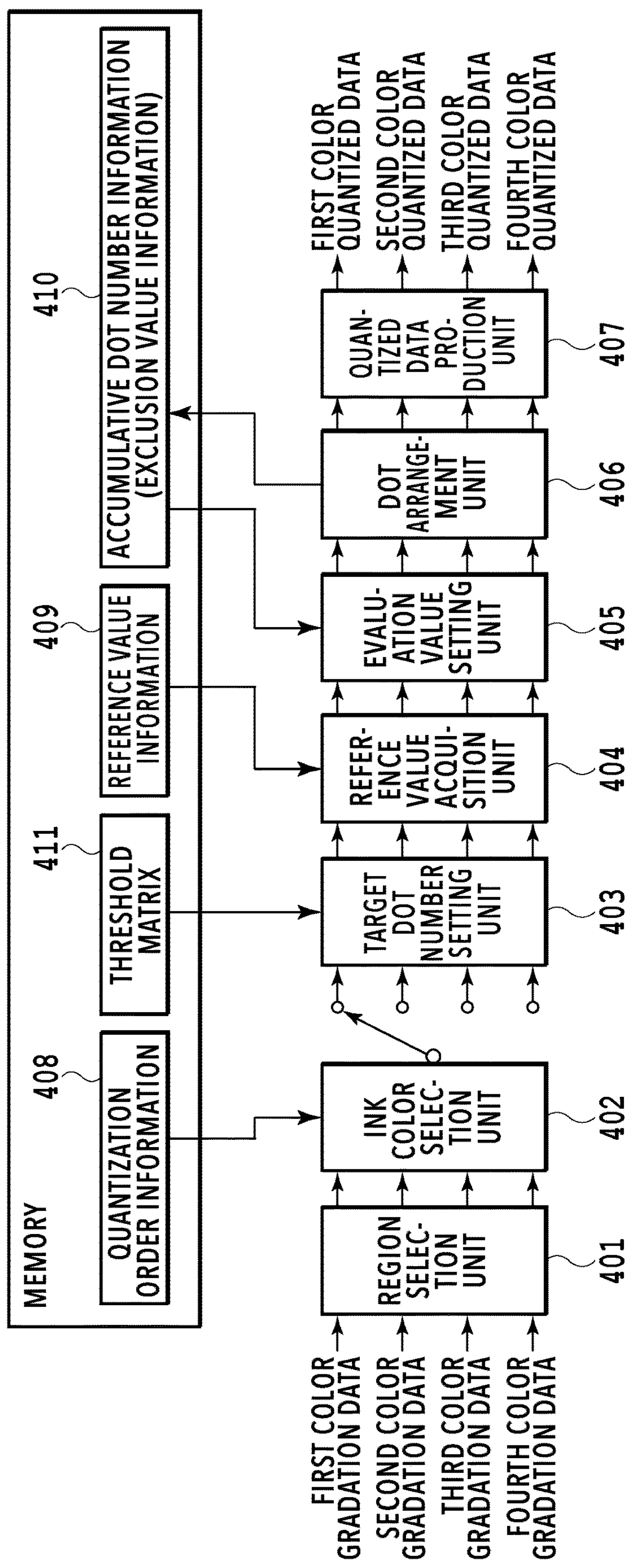
FIG. 4 is a block diagram for description of a software configuration in a first embodiment.

FIG. 4 is a block diagram for description of a functional configuration in the quantization processing of the present embodiment. The following provides simple description on the function of each block. The KCMY data generated through the ink color separation processing at S302 is input to a region selection unit 401 for each ink color. Hereinafter, data for each ink color included in the KCMY data is referred to as gradation data in the present specification. For each gradation data, the number of pixels is same, and the number of pixels in the longitudinal direction and the number of pixels in the lateral direction are each same. In FIG. 4, a first color is black (K), a second color is cyan (C), a third color is magenta (M), and a fourth color is yellow (Y).

The region selection unit 401 divides the gradation data including multiple pixels into multiple unit regions, and sets one of the unit regions as a processing target region. In this case, the region selection unit 401 divides the gradation data of each color into multiple unit regions at the same position. Then, the region selection unit 401 provides the gradation data of each color for the set processing target region to an ink color selection unit 402.

The ink color selection unit 402 refers to quantization order information 408 stored in a memory, selects a processing target color from among the first to fourth colors, and provides the gradation data of the selected ink color for the processing target region to a target dot number setting unit 403. The quantization order information 408 indicates the order of color for which the quantization processing is executed.

The target dot number setting unit 403 refers to a threshold matrix 411 stored in the memory, and sets a target number D of dots to be arranged in the processing target region for each color based on the gradation data provided by the ink color selection unit 402. The target dot number is the number of dots to be arranged in the processing target region. In this example, through the quantization processing, a binary value that specifies dot printing (1) or no dot printing (0) for each pixels. In other words, the target dot number is the number of pixels for which a value (in this example, “1”) indicating printing is to be set through quantization among pixels included in the processing target region. Then, the set target dot number D is provided to a reference value acquisition unit 404 together with the gradation data for the processing target region.

The reference value acquisition unit 404 refers to reference value information 409 stored in the memory and acquires a reference value R of the processing target color for the processing target region. In the present embodiment, the reference value information 409 provisionally indicates the priority of dot arrangement on each pixel in the processing target region 701 as the reference value.

An evaluation value setting unit 405 refers to exclusion value information 410 stored in the memory, and sets an evaluation value Ev to each pixel of the processing target color included in the processing target region based on the exclusion value information and the reference value R acquired by the reference value acquisition unit 404. The exclusion value is information related to dot arrangement and used for control to avoid dot overlapping. Although a detailed calculation method will be described later, it is preferable to dispose no dot on a pixel for which the exclusion value is larger. In the present embodiment, accumulative dot number information 410 is used as the exclusion value information including the exclusion value of each pixel included in the processing target region. The evaluation value Ev indicates a definitive priority for dot arrangement.

A dot arrangement unit 406 arranges dots on individual pixels included in the processing target region based on the evaluation value Ev set by the evaluation value setting unit 405 and the target dot number D determined by the target dot number setting unit. In addition, the dot arrangement unit 406 updates the accumulative dot number information 410 based on a result of the arrangement.

A quantized data production unit 407 generates quantized data printable by the printing apparatus 100 based on dot arrangement data generated by the dot arrangement unit 406, and outputs the generated quantized data to the printing apparatus 100 as print data. The quantized data of each color is equivalent to the K'C'M'Y' data described with the flowchart in FIG. 3.

In FIG. 4, the memory is an integration of the non-transitory HDD 203 and the transitory RAM 202 in the image processing apparatus 200 described with reference to FIG. 2. In addition, each block described above is a function unit on software executed by the CPU 201 illustrated in FIG. 2 in effect.

Figure 5:
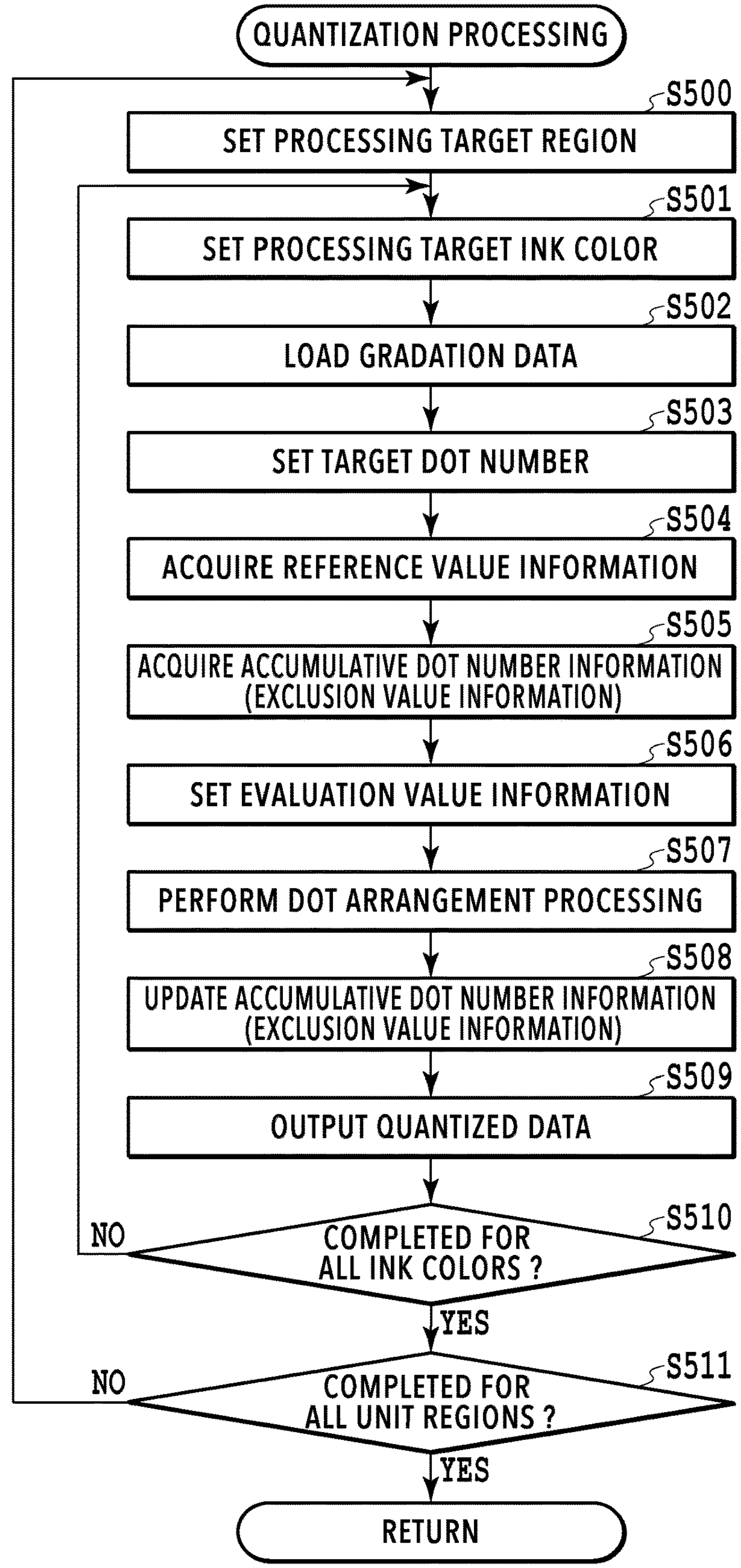
FIG. 5 is a flowchart for description of the process of quantization processing of the first embodiment.

FIG. 5 is a flowchart for description of the process of processing executed by the CPU 201 by using each block illustrated in FIG. 4 in the quantization processing at S303. In addition, FIGS. 6 and 7A to 7K are diagrams for specific description of steps of the quantization processing of the present embodiment and conversion of the pixel value of each pixel. The following describes the quantization processing executed in the present embodiment in detail in accordance with flowcharts described with reference to FIGS. 5, 6, and 7A to 7K.

When the present processing is started, first at S500, the region selection unit 401 sets, as a processing target region, one unit region from an image region as a printing target.

Figure 6:
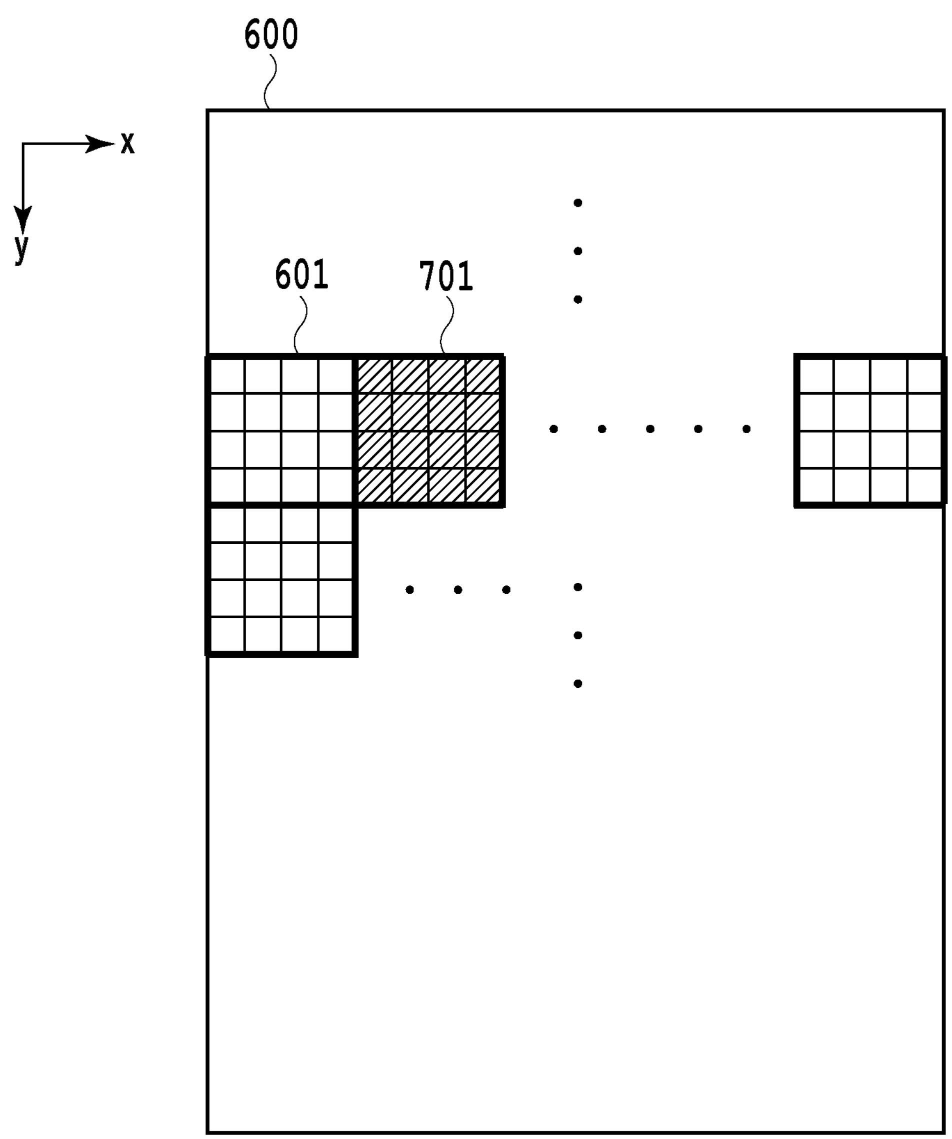
FIG. 6 is a conceptual diagram for description of a processing target region setting method.

FIG. 6 is a conceptual diagram for description of the processing target region setting method. The region selection unit 401 divides an image region 600 as a printing target into multiple unit regions 601 having the same shape, and sets one of the unit regions as a processing target region. In the present embodiment, the image region as the printing target is partitioned into the units of 4×4 pixels, and each 4×4-pixel region is treated as a unit region 601. Then, the unit regions 601 are sequentially set as a processing target region 701 and predetermined quantization processing is performed. FIG. 6 illustrates a situation in which the hatched unit region is set as the processing target region 701. The order of setting the processing target region is not particularly limited, but in the present embodiment, the processing target region is sequentially set in the positive x direction from the upper-left corner in FIG. 6, and when processing at the endmost part is ended, the processing target region moves onto a row adjacent in the positive y direction.

The description returns to the flowchart of FIG. 5. After the processing target region is set at S500, the ink color selection unit 402 sets a processing target color from among black (first color), cyan (second color), magenta (third color), and yellow (fourth color) at S501. The order of colors to be set as the processing target color is stored in the memory of the HDD 203 as the quantization order information 408 in advance, and the ink color selection unit 402 sets a new color in accordance with the color order indicated by the quantization order information 408 each time the present process is performed.

At S502, the ink color selection unit 402 loads gradation data of the processing target color of the processing target region onto the memory. FIG. 7A illustrates exemplary gradation data loaded at S502. A gradation value I of 0 to 255 is associated with each of 4×4 pixels included in the processing target region 701.

At S503, the target dot number setting unit 403 sets the target dot number of the processing target color to be arranged in the processing target region. In the present embodiment, the target dot number setting unit 403 sets the target dot number D by referring to the threshold matrix 411 stored in the memory in advance.

FIG. 7B illustrates an exemplary threshold matrix 411 referred to at S503. The threshold matrix 411 stores a threshold Th of 0 to 254 in association with a pixel position. FIG. 7B only illustrates a pixel region of 8×12 pixels, but in reality, the pixel position and the threshold Th are stored in association with each other for a larger pixel region.

The target dot number setting unit 403 first calculates an average value Ave of the gradation values I in the processing target region based on the gradation data of the processing target color of the processing target region. Subsequently, the target dot number setting unit 403 reads a matrix (region surrounded by bold lines) of 4×4 (16) thresholds Th for the processing target region from the threshold matrix 411, and compares the threshold Th for each pixel with the average value Ave of the gradation values I illustrated in FIG. 7A. Then, the number of pixels for which the average value Ave is larger than the threshold among the 16 pixels is counted, and the count value is set as the target dot number D of the processing target color for the processing target region 701.

Specifically, when the gradation data of the processing target region is that illustrated in FIG. 7A, the average value Ave of the gradation value I is calculated to be 1756/16=109.75. Then, the number of pixels for which the threshold Th satisfies "Ave>Th" among the 16 pixels surrounded by bold lines in FIG. 7B is seven. Thus, in this case, the target dot number D of the processing target region 701 is seven.

The threshold matrix 411 according to the present embodiment has a blue-noise characteristic weighted on dot dispersity. Specifically, when dots are arranged in the ascending order of the threshold of 0 to 254 included in the threshold matrix 411, dot arrangement having excellent dispersity can be stably obtained irrespective of the number of dots. Then, in the threshold matrix 411, the same number of thresholds Th having the same value are preferably arranged in a predetermined region of 16×16 pixels or 256×256 pixels. Specifically, for example, 257 or 256 values of 0 to 254 are preferably included in a region of 256×256 pixels.

The description returns to the flowchart of FIG. 5. At S504, the reference value acquisition unit 404 acquires reference value information stored in the memory in advance.

FIGS. 7C to 7E are diagrams illustrating exemplary reference value information 409. In this example, the processing target region 701 has 16 pixels of 4×4 pixels, and thus the reference value information is information in which a value of 1 to 16 is associated as a provisional priority with each of the 16 pixels.

FIG. 7E illustrates the reference value information in the present embodiment. The reference value acquisition unit 404 reads a 4×4-pixel region corresponding to the processing target region 701 from the threshold matrix 411 illustrated in FIG. 7B, and allocates the reference value R of 1 to 16 to each pixel in the ascending order of the threshold Th, thereby producing the reference value information. In this case, the threshold matrix 411 can be used as the reference value information, and thus a memory capacity prepared for the reference value information can be reduced. In the present embodiment, the reference value information is produced based on the threshold matrix, but reference value information prepared in advance may be held. For example, FIG. 7D illustrates the reference value information held in advance. Similarly to the threshold matrix used for the quantization processing, the reference value information is of a dot dispersion type. In a case of the dot dispersion type, values indicating the priority are arranged in dispersion in the reference value information. When the threshold matrix and the reference value information of the dot dispersion type are used in this manner, dots can be arranged at high dispersity, thereby reducing granularity. In any reference value information illustrated in FIGS. 7C to 7E, the reference value R of 1 to 16 indicates a provisional value of the priority for dot arrangement. Specifically, the provisional priority for dot arrangement is highest at a pixel for which the reference value is "1" and is lowest at a pixel for which the reference value is "16".

The description returns to the flowchart of FIG. 5. At S505, the evaluation value setting unit 405 acquires accumulative dot number information stored in the memory. In the present embodiment, the accumulative dot number information is information in which the accumulative number of dots already arranged in the processing target region through the quantization processing is stored for each pixel included in the processing target region. In other words, when there are other colors for which the quantization processing is executed before the processing target color, the accumulative number of dots for the other colors is held as the accumulative dot number information. Thus, when the processing target color is the first color (black), the accumulative dot number information is set to be "0" for all pixels in the processing target region.

FIG. 7F illustrates exemplary accumulative dot number information. In this example, the current processing target color is the second color (cyan), and a state in which results of quantization of the first color (black) are reflected on the accumulative dot number information is illustrated. Specifically, among the 16 pixels illustrated in FIG. 7F, a pixel to which "1" is allocated indicates that one dot is already arranged, and a pixel to which "0" is allocated indicates that no dot is arranged. In the present embodiment, dot arrangement of a color as the next processing target color is determined by using such accumulative dot number information as the exclusion value information. Hereinafter, the accumulative dot number information is referred to as the exclusion value information, and the accumulative dot number of each pixel is referred to as an exclusion value H.

At S506, the evaluation value setting unit 405 sets the evaluation value Ev for each pixel included in the processing target region based on the exclusion value information acquired at S505 and the reference value information acquired at S504. The evaluation value setting unit 405 sets, for each pixel included in the processing target region, the evaluation value Ev so that the evaluation value Ev is larger for a pixel for which the exclusion value is smaller and the reference value is smaller. The evaluation value Ev indicates the priority, and the priority is higher as the value is smaller.

FIGS. 7G and 7H are diagrams illustrating the procedure of setting the evaluation value Ev based on the reference value information illustrated in FIG. 7E and the exclusion value information illustrated in FIG. 7F. In the present embodiment, arrangement of dots in colors different from each other on the same pixel is prevented as much as possible. Thus, when the exclusion value information is that illustrated in FIG. 7F, the evaluation value setting unit 405 first extracts only five pixels for which the exclusion value H is "0", and sets the priority (evaluation value) for dot printing among the five pixels based on the reference value information illustrated in FIG. 7E. Specifically, the evaluation value Ev of 1 to 5 is set to each of the five pixels for which the exclusion value H is "0" in the ascending order of the reference value R. FIG. 7G illustrates a state in which the evaluation value Ev of 1 to 5 is set to each of the five pixels for which the exclusion value H is "0".

Subsequently, the evaluation value setting unit 405 sets the evaluation value Ev of 6 to 16 to each of the remaining pixels for which the exclusion value H is "1" in the ascending order of the reference value R. FIG. 7H illustrates a state in which the evaluation value Ev of 1 to 16 is set to all pixels.

The description returns to the flowchart of FIG. 5. At S507, the dot arrangement unit 406 arranges dots of the processing target color in the processing target region based on the target dot number D set at S503 and the evaluation value Ev set at S506. Specifically, dots in a number indicated by the target dot number D are arranged one by one at each pixel in the processing target region in the ascending order of the evaluation value Ev set at S506, thereby generating the dot arrangement data. The dot arrangement unit 406 generates the dot arrangement data of the processing target color in the processing target region by storing "1" for each pixel at which a dot is arranged and "0" for a pixel at which no dot is arranged.

FIG. 7I is a diagram schematically illustrating dot arrangement determined for the processing target region for which the evaluation value Ev is set as illustrated in FIG. 7H and the target dot number D is seven. In FIG. 7I, a region illustrated in black represents a pixel at which a dot of the processing target color is arranged, and a region illustrated in white represents a pixel at which no dot of the processing target color is arranged. In FIG. 7I, dots are arranged at all pixels for which the exclusion value H is "0" and some of the pixels for which the exclusion value H is "1" in FIG. 7F. FIG. 7K illustrates quantized data generated in accordance with the dot arrangement data illustrated in FIG. 7I. As for the pixels in the processing target region, "printing (1)" is associated with each pixel at which a dot of the processing target color is arranged, and "no printing (0)" is associated with the other pixels. Such quantized data indicating "printing (1)" or "no printing (0)" in the processing target region is output to the quantized data production unit 407.

At S508, the dot arrangement unit 406 updates the exclusion value information (accumulative dot information) based on the dot arrangement data generated at S507. Specifically, the exclusion value H for a pixel at which a dot of the processing target color is arranged at S507 is incremented by one and stored in the memory as new exclusion value information (accumulative dot information).

FIG. 7J illustrates a result obtained when the exclusion value information illustrated in FIG. 7F is updated in accordance with the dot arrangement data illustrated in FIG. 7I. In FIG. 7J, a pixel for which the exclusion value H is "2" means that a dot of the first color and a dot of the second color are arranged at the pixel, and a pixel for which the exclusion value H is "1" means that any one of a dot of the first color and a dot of the second color is arranged at the pixel.

The description returns to the flowchart of FIG. 5. At S509, the quantized data production unit 407 generates quantized data of the processing target color in accordance with the dot arrangement data generated at S507. In the present embodiment, the quantized data production unit 407 accumulates quantized data of each region to produce quantized data of a whole image of the processing target color.

At S510, the region selection unit 401 determines whether the quantization processing for all ink colors is completed in the processing target region. When there is an ink color for which the quantization processing is yet to be performed, the process returns to S501 to set the next processing target color and then performs the processing at S502 to S509 for the newly set processing target color. When it is determined at S510 that the quantization processing for all ink colors is completed in the processing target region, the process proceeds to S511.

At S511, the quantized data production unit 407 determines whether the quantization processing at S502 to S509 is completed for all unit regions. When there is a unit region for which the quantization processing is yet to be performed, the process returns to S500, and the region selection unit 401 sets the next unit region as a new processing target region and performs the processing at S501 to S510 for the new processing target region. When it is determined at S511 the quantization processing is completed for all unit regions, the present processing is ended.

Through the above-described series of processing, a smaller evaluation value Ev is set to a pixel in the processing target region as the exclusion value H is smaller, in other words, as the number of dots arranged for an already processed ink color is smaller. Then, a dot of the processing target color is preferentially arranged at a pixel for which the evaluation value Ev is smaller in the processing target region. As a result, the number of dots arranged at one pixel in the processing target region is reduced, thereby reducing color development defect due to dot overlapping on a print medium and reducing granularity.

Since dot rearrangement is performed in the processing target region that is a unit region including multiple pixels, interference between image data and a threshold matrix can be prevented. Moreover, since dots in a number (the target dot number) indicated by the gradation data for each ink color are arranged in each unit region, density and hue indicated by the gradation data are stored in the unit region and can be reproduced on a print medium even when the above-described rearrangement is performed.

Specifically, according to the present embodiment, when an image is printed by using multiple kinds of colorants, it is possible to output the image with reduced color development defect due to dot overlapping and reduced granularity.

In the present embodiment, the quantization processing is executed by using the threshold matrix having the blue-noise characteristic and the reference value information of the dot dispersion type. However, dots are concentrated as much as possible in the quantization processing of a dot concentration type, and the present embodiment is applicable to the dot concentration type. FIG. 7C illustrates the reference value information of the dot concentration type. In a case of the dot concentration type, multiple dots are printed in clusters on a print medium, and thus output concentration is unlikely to be affected by the inter-dot position difference, and the gradation value of each pixel and the output density can be linearly maintained.

Second Embodiment

In the present embodiment as well, the quantization processing is performed in accordance with the flowchart illustrated in FIG. 5 by using the image processing apparatus described with reference to FIGS. 1 to 4. In the present embodiment, the content of the exclusion value information (accumulative dot information) is different from that in the first embodiment. In the first embodiment, the exclusion value H before update is incremented by “1” at a pixel for which dot arrangement of the processing target color is determined irrespective of an ink color as the processing target color. However, in the present embodiment, a weight coefficient wi that is different for each ink color is prepared, and the exclusion value H before update is incremented by the weight coefficient wi of the processing target color.

In the present embodiment, the weight coefficient of each ink color is set based on an optical density ratio of dots printed on a print medium. In this example, the optical density ratio of 4:2:2:1 is obtained in combination of black, cyan, magenta, and yellow. The weight coefficient of black is “4”, the weight coefficient of cyan is “2”, the weight coefficient of magenta is “2”, and the weight coefficient of yellow is “1”.

FIGS. 8A to 8H are diagrams illustrating the relation between the dot arrangement data and the exclusion value information in the present embodiment. The following describes the quantization processing in the present embodiment with reference to FIGS. 8A to 8H and in accordance with the flowchart of FIG. 5. In the present embodiment as well, at S501, the processing target color is set to be black, cyan, magenta, and yellow in the stated order.

FIG. 8A illustrates exemplary dot arrangement data set at S507 when the processing target color is the first color (black). In addition, FIG. 8B illustrates the exclusion value information updated at S508 in this case. In FIG. 8B, only for any pixel at which a dot is arranged in FIG. 8A, the initial value “0” is incremented by the weight coefficient “4” of black.

FIG. 8C illustrates exemplary dot arrangement data set at S507 when the processing target color is the second color (cyan). Cyan dots are arranged based on the exclusion value information illustrated in FIG. 8B, and thus the dot arrangement data of cyan has a substantially exclusive relation with the dot arrangement data of black illustrated in FIG. 8A.

FIG. 8D illustrates the exclusion value information updated at S508 when the processing target color is cyan. In FIG. 8D, only for a pixel at which a cyan dot is arranged in FIG. 8C, the exclusion value H illustrated in FIG. 8B is incremented by the weight coefficient “2” of cyan.

The following describes a case in which the processing target color is set to be the third color (magenta) in such a state. In this example, the target dot number D is set to be seven at S503, and the reference value information illustrated in FIG. 8E is obtained at S504.

In this case, at S506, the CPU 201 refers to the exclusion value information illustrated in FIG. 8D and performs rearrangement of the reference value R illustrated in FIG. 8E. Specifically, first, the evaluation value Ev of 1 to 3 is set to three pixels for which the exclusion value H is “0” in the ascending order of the reference value R. Subsequently, the evaluation value Ev of 4 to 10 in the ascending order of the reference value R is set to seven pixels for which the exclusion value is “2”. Furthermore, the evaluation value Ev of 11 to 15 is set to four pixels for which the accumulative dot number is “4” in the ascending order of the reference value R. Lastly, the evaluation value Ev of 16 is set to one pixel for which the accumulative dot number is “6”. FIG. 8F illustrates evaluation value information obtained when the evaluation value Ev of each pixel is set in this manner.

At S507, the dot arrangement unit 406 arranges seven dots indicated by the target dot number D one by one in the processing target region in the ascending order of the evaluation value Ev set at S506, thereby generating the dot arrangement data. FIG. 8G illustrates the dot arrangement data generated in this manner. In the exclusion value information illustrated in FIG. 8D, magenta dot is preferentially arranged at any pixel for which the exclusion value H is smaller.

More detailed description is provided. When comparison is performed between FIGS. 8A, 8C, and 8G illustrating the dot arrangement data of black, cyan, and magenta, a magenta dot is preferentially arranged at a pixel at which no black dot nor cyan dot is arranged, and also arranged at a pixel at which only a cyan dot is arranged. This is because, since the weight coefficient “4” of black is larger than the weight coefficient “2” of cyan, the evaluation value Ev of a pixel at which a black dot is arranged is larger than the evaluation value Ev of a pixel at which a cyan dot is arranged, and the priority for arrangement of a magenta dot decreases. Then, the priority for arrangement of a magenta dot decreases in the order of a pixel at which no dot is arranged, a pixel at which only a cyan dot is arranged, a pixel at which only a black dot is arranged, and a pixel at which a black dot and a cyan dot are arranged.

At S508, the dot arrangement unit 406 updates the exclusion value information based on the dot arrangement data generated at S507. Specifically, the exclusion value H of a pixel at which a dot of the processing target color is arranged at S507 is incremented by a magenta weight coefficient w2 of “2” and stored in the memory as new exclusion value information. FIG. 8H illustrates the exclusion value information updated at S508. The exclusion value illustrated in FIG. 8D is incremented by the magenta weight coefficient w2 of “2” only for a pixel at which a dot is arranged in FIG. 8G. The exclusion value information illustrated in FIG. 8G is used when the CPU 201 generates the dot arrangement data of the fourth color (yellow) thereafter.

On a print medium, an overlapping dot formed by placing over multiple ink colors is easily noticeable and has a decreased color development characteristic as compared to a single dot formed in one ink color. However, the dot noticeability and the color development characteristic are different between overlapping dots due to combinations of ink colors forming the overlapping dots. For example, an overlapping dot formed of cyan and yellow is unlikely to be noticeable and has small influence on granularity as compared to an overlapping dot formed of black and cyan. When the exclusion value H is managed by using the weight coefficient different for each ink color and a dot of the processing target color is preferentially arranged at a pixel for which the exclusion value H is small as in the present embodiment, the granularity can be reduced while degradation of the color development characteristic is prevented as much as possible in a situation in which printing of an overlapping dot cannot be avoided.

In the above description, the weight coefficient of each color is set based on the optical density ratio of dots printed on a print medium, but the present embodiment is not limited thereto. For example, saturation decrease when a dot is overlapped among special inks such as green, orange, and purple has larger influence on an image than saturation decrease when a dot is overlapped among the above-described four color inks. Thus, in such a case, the weight coefficient of each ink color is preferably set based on not only the optical density but also another factor such as the hue or the saturation.

With a particular ink color combination such as a combination of black and gray or a combination of cyan and light cyan, the hue and the saturation are not largely affected by dot overlapping. Thus, in such a case, multiple pieces of the exclusion value information may be prepared in association with ink colors, and the weight coefficient when the exclusion value H is updated may be different between the pieces of the exclusion value information. Then, when each ink color is the processing target color, at S505, the associated exclusion value information may be acquired from among the multiple pieces of the exclusion value information.

For example, the weight coefficient of black in the exclusion value information for gray is preferably set to be smaller than the weight coefficient of black in the exclusion value information for cyan. In addition, the weight coefficient of cyan in the exclusion value information for light cyan is preferably set to be smaller than the weight coefficient of cyan in the exclusion value information for magenta. In this manner, overlapping of ink colors between which the hue is similar is prioritized to overlapping of ink colors between the hue is different, and the color development characteristic of the whole image can be improved.

In addition, the weight coefficient as described above may be changed for each processing target region. For example, when the hue of the processing target region indicated by R'G'B' data obtained at S301 in FIG. 3 is close to G (green), overlapping between a cyan dot and a yellow dot is preferably prioritized in some cases. In such a case, in the exclusion value information for yellow, the weight coefficient of cyan needs to be set to be smaller than the weight coefficients of black and magenta.

According to the present embodiment described above, when an image is printed by using multiple colorants, the image can be output with reduced color development defect due to dot overlapping and with reduced granularity.

Third Embodiment

In the present embodiment as well, a series of image processing is performed in accordance with the flowchart illustrated in FIG. 3 by using the image processing apparatus described with reference to FIGS. 1 and 2.

Figure 9:
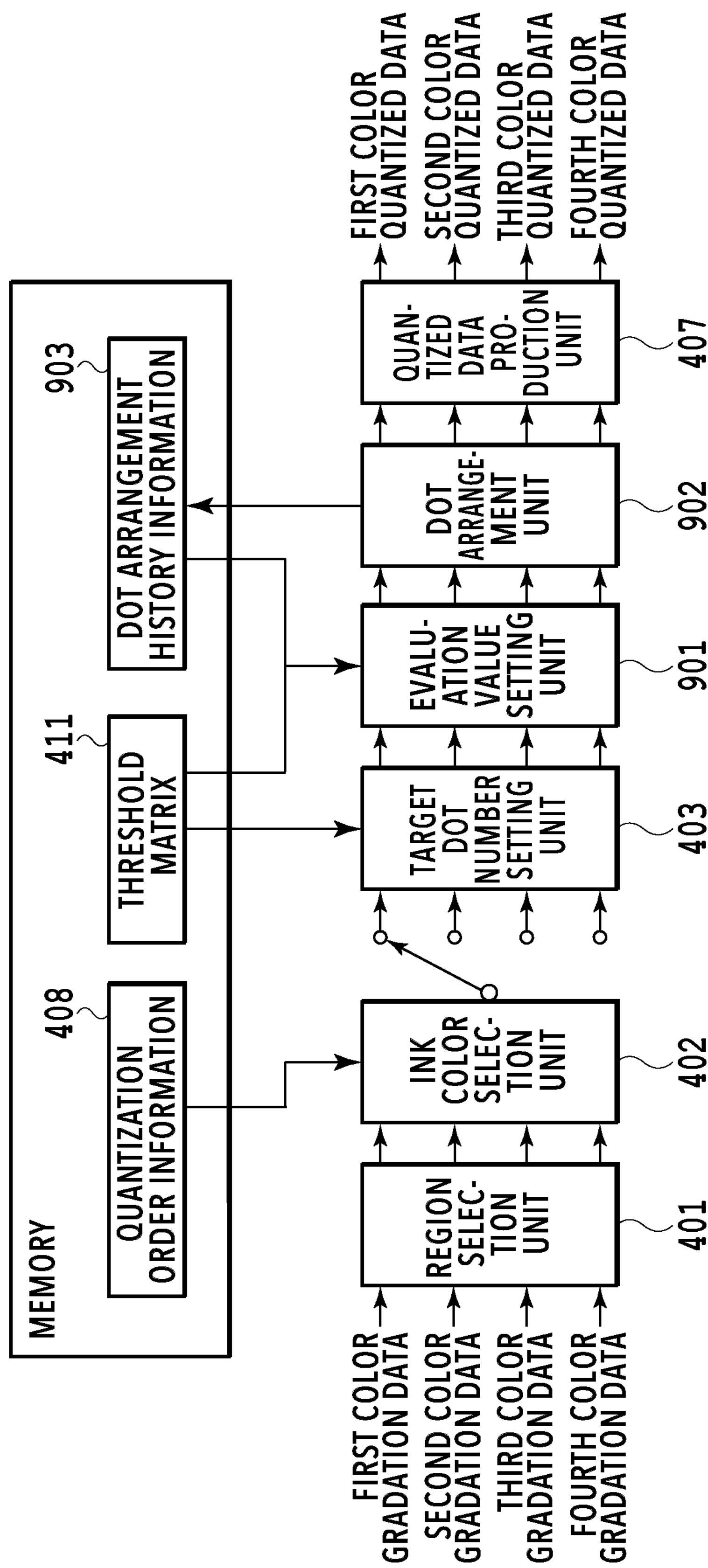
FIG. 9 is a block diagram for description of a software configuration in a third embodiment.

FIG. 9 is a block diagram for description of a functional configuration in the quantization processing of the present embodiment. Differences from FIG. 4 are as follows: an evaluation value setting unit 901 uses the threshold matrix 411 as the reference value information, and a dot arrangement history information 903 is prepared in place of the accumulative dot number information 410. The dot arrangement history information 903 is information in which dot arrangement information of an ink color for which the dot arrangement data is already generated is stored in association with the ink color. The evaluation value setting unit 901 according to the present embodiment sets the evaluation value Ev for each pixel by using the threshold matrix 411 and the dot arrangement history information 903. In addition, a dot arrangement unit 902 according to the present embodiment updates the dot arrangement history information 903 based on the set dot arrangement data.

Figure 10:
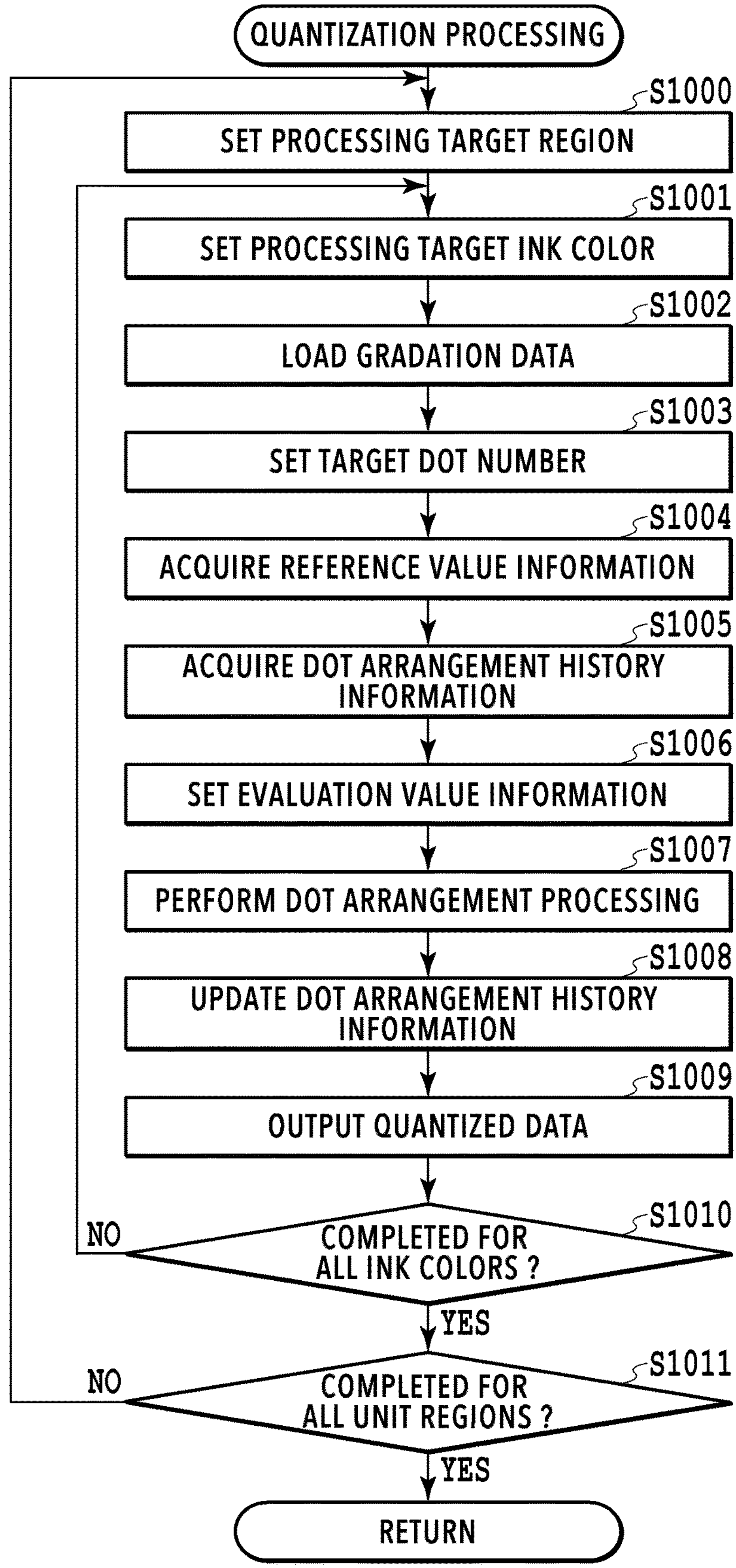
FIG. 10 is a flowchart for description of the process of quantization processing of the third embodiment.

FIG. 10 is a flowchart for description of the process of processing executed by the CPU 201 according to the present embodiment by using each block illustrated in FIG. 9 in the quantization processing at S303. In addition, FIGS. 11A to 11J are diagrams for specific description of steps of the quantization processing when the processing target color is the first color (black). The following describes the quantization processing for the first color (black) in accordance with a flowchart illustrated in FIG. 10 with reference to FIGS. 11A to 11J.

At S1002, the ink color selection unit 402 loads the gradation data of black of the processing target region onto the memory. In this example, the gradation data illustrated in FIG. 11A is loaded. At S1003, the target dot number setting unit 403 sets the target number D of black dots to be arranged in the processing target region. Specifically, first, 4×4 thresholds for the processing target region are read from the threshold matrix 411 and each compared with the average value Ave of the gradation value of the gradation data illustrated in FIG. 11A. Then, the number of pixels for which the average value Ave is larger than the threshold among the 16 pixels is counted, and the count value is set as the target dot number D. When the gradation data is that illustrated in FIG. 11A, the average value Ave is 128. In addition, when the 4×4 thresholds read in association with the processing target region are those illustrated in FIG. 11C, the target dot number D is set to be eight.

At S1004, the evaluation value setting unit 901 acquires and loads the reference value information stored in the memory in advance. In this example, the 4×4 thresholds illustrated in FIG. 11C, which are also used at S1003, are used as the reference value information.

At S1005, the evaluation value setting unit 901 acquires the dot arrangement history information 903 (refer to FIG. 9) stored in the memory. In the present embodiment, the dot arrangement history information is the dot arrangement data of each ink color for which the quantization processing is ended in the processing target region. When the processing target color is the first color (black), the CPU 201 acquires null data. When the processing target color is the second color (cyan), the CPU 201 acquires the dot arrangement history information of black. When the processing target color is the third color (magenta), the CPU 201 acquires the dot arrangement history information of black and the dot arrangement history information of cyan.

At S1006, the evaluation value setting unit 901 derives and sets the evaluation value Ev for each pixel included in the processing target region based on the dot arrangement history information acquired at S1005 and the reference value information (FIG. 11C) acquired at S1004. The following describes an evaluation value deriving method in the present embodiment in detail.

To calculate the evaluation value Ev, the evaluation value setting unit 901 according to the present embodiment first calculates a first evaluation value Ev1 for each pixel included in the processing target region. The first evaluation value Ev1 is calculated in accordance with Expression (1).

$$E1=(I/I\max)-(R/R\max)-(H/H\max) \qquad \text{Expression (1)}$$

In the expression, I represents the gradation value of an interest pixel indicated by the gradation data, and Imax represents the maximum value thereof. In the present embodiment, the gradation data is of 8 bits (256 tones), and thus Imax is 255. For example, when the gradation data is of 16 bits (65536 tones), Imax is 65535. FIG. 11B illustrates normalized values I/Imax for 4×4 pixels for the processing target region. Each value I/Imax is a real number having a value of 0 to 1, and a dot is more likely to be arranged at a pixel for which the value is larger.

In the expression, R represents the reference value of each pixel indicated by the reference value information, and Rmax represents the maximum value thereof. In a case of the present embodiment, since the reference value information is obtained from the threshold matrix 411, Rmax is 254. FIG. 11D illustrates normalized values R/Rmax of the reference value information. Each value R/Rmax is a real number having a value of 0 to 1, and a larger value means that the provisional priority for dot arrangement is lower at a pixel.

In the expression, H represents the exclusion value obtained from the dot arrangement history information. In the present embodiment, the exclusion value H can be obtained by using Expression (2).

$$H=\Sigma(wi\times Di) \qquad \text{Expression (2)}$$

In the expression, i represents a number indicating the processing order of the processing target color. In the present embodiment, since the quantization processing is performed in the order of black, cyan, magenta, and yellow, i is 1, 2, 3, and 4 when the processing target ink is black, cyan, magenta, and yellow, respectively. In addition, wi represents the weight coefficient for each ink color. In the present embodiment, the weight coefficient of each ink color is set based on the optical density ratio of dots printed on a print medium so that w1 is four, w2 is two, w3 is two, and w4 is one.

In Expression (2), Di represents the number of dots of an ink color i arranged at each pixel. For example, when a black dot is arranged at a pixel, D1 is one at the pixel. Furthermore, E represents a sum total over 1 to (i−1).

In this manner, the exclusion value H is calculated by calculating the product of the number Di of dots arranged at each pixel and the weight coefficient wi specific to each ink color i and summing the products of all the ink colors i processed before the processing target color. When the processing target color is the first color (black), in other words, in a case of i=1, the exclusion value H is zero for all pixels. Thus, the exclusion value information of 4×4 pixels as illustrated in FIG. 11E is obtained by using Expression (2).

In Expression (1), Hmax represents the maximum value of the exclusion value H in the processing target region. In the present embodiment, the value H/Hmax obtained by normalizing the exclusion value H with the maximum value Hmax is referred to as an exclusion control value Hn. The exclusion control value Hn is a real number having a value of 0 to 1, and a larger value indicates that a dot is more unlikely to be arranged at a pixel. When the processing target color is the first color (black), the maximum value Hmax is zero, but the exclusion control value Hn is fixed to zero. FIG. 11F illustrates exclusion control value information in the processing target region when the processing target color is the first color (black).

FIG. 11G is a diagram illustrating first evaluation value information calculated in accordance with Expression (1) based on the gradation data (1/Imax) after normalization in FIG. 11B, the reference value information (R/Rmax) after normalization in FIG. 11D, and the exclusion control value information (Hn) in FIG. 11F. In the present embodiment, the first evaluation value Ev1 indicates the easiness of dot arrangement at each pixel. A dot is more likely to be arranged at a pixel for which the value is positively larger, and a dot is more unlikely to be arranged at a pixel for which the value is negatively larger.

Subsequently, the evaluation value setting unit 901 sets a value of 1 to 16 as a second evaluation value Ev2 for each pixel in the processing target region in the descending order of the first evaluation value Ev1. When there are multiple pixels for which the first evaluation value Ev1 is same, a pixel having a larger gradation value I may be prioritized, a pixel positioned on the upper-left side in the processing target region may be prioritized, or, the priority may be set at random.

FIG. 11H illustrates the evaluation value information in which the second evaluation value Ev2 of 1 to 16 is set for each pixel included in the processing target region. Hereinafter, the second evaluation value Ev2 is simply referred to as the evaluation value Ev in the present embodiment.

The description returns to the flowchart of FIG. 10. At S1007, the dot arrangement unit 902 arranges a dot of the processing target color at each pixel included in the processing target region based on the target dot number D set at S1003 and the evaluation value Ev set at S1006. Specifically, dots in a number indicated by the target dot number D are arranged one by one in the processing target region in the ascending order of the evaluation value Ev set at S1006, thereby generating the dot arrangement data.

FIG. 11I is a diagram illustrating the dot arrangement data generated for the processing target region for which the target dot number D is eight through the dot arrangement determination processing at S1007 based on the evaluation value information in FIG. 11H. In FIG. 11I, a region illustrated in black represents a pixel at which a black dot is arranged, and a region illustrated in white represents a pixel at which no black dot is arranged.

At S1008, the dot arrangement unit 902 updates the dot arrangement history information based on the dot arrangement data generated at S1007. Specifically, the dot arrangement data generated at S1007 is stored in the memory in association with the ink color i. In the present example, the dot arrangement data illustrated in FIG. 11I is stored in the memory in association with the first color (black). The stored dot arrangement history information is read from the memory as the dot arrangement history information of the first color (black) at S1005 after the processing target color is changed.

At S1009, the quantized data production unit 407 generates quantized data in accordance with the dot arrangement data generated at S1007, and stores the generated quantized data in the memory. FIG. 11I illustrates quantized data generated in accordance with the dot arrangement data illustrated in FIG. 11I.

When the above-described processing for black is completed, the process returns to S1001, the second color (cyan) is set as the processing target color, and the processing at S1002 to S1009 is performed.

FIGS. 12A to 12J are diagrams illustrating steps of processing when the processing target color is the second color (cyan), similarly to FIGS. 11A to 11J. FIG. 12A illustrates the gradation data of cyan loaded at S1002. In this case, the gradation data has normalized values I/Imax as illustrated in FIG. 12B.

FIG. 12C illustrates 4×4 thresholds for the processing target region and read from the threshold matrix for cyan, and based on this information, the target dot number D of cyan is set to be four at S1003. In addition, the 4×4 thresholds illustrated in FIG. 12C are used as reference value information R, and the reference value information R has normalized values R/Rmax as illustrated in FIG. 12D.

FIG. 12E illustrates the exclusion value information derived when the processing target color is cyan. The exclusion value information is derived by referring to the dot arrangement history information (information same as the quantized data in FIG. 11I) of the first color (black) and calculating the exclusion value H of each pixel in accordance with Expression (2). In a case of the exclusion value information illustrated in FIG. 12E, the maximum value Hmax of the exclusion value H is four, and the exclusion control value information as illustrated in FIG. 12F is obtained by normalizing the exclusion value H of each pixel.

FIG. 12G is a diagram illustrating the first evaluation value information derived in accordance with Expression (1) based on the gradation data (I/Imax) after normalization illustrated in FIG. 12B, the reference value information (R/Rmax) after normalization illustrated in FIG. 12D, and exclusion value control value information illustrated in FIG. 12F. In addition, FIG. 12H illustrates the evaluation value information for cyan derived based on the exclusion value control value information in FIG. 12G. Furthermore, FIG. 12I illustrates the dot arrangement data set for the processing target region for which the evaluation value Ev is set as illustrated in FIG. 12H and the target dot number D is four, and FIG. 12J illustrates the quantized data based on the data in FIG. 12I. In the dot arrangement data illustrated in FIG. 12I, dots are arranged at positions in an exclusive relation with those in the dot arrangement data of the first color (black) illustrated in FIG. 11I.

Thereafter, processing of the third color (magenta) and processing of the fourth color (yellow) are performed for the processing target region in the stated order in accordance with the above-described process. Details of the processing are same as those in the cases of the first color (black) and the second color (cyan), and description thereof is omitted. FIGS. 13A to 13J are diagrams illustrating steps of the processing when the processing target color is the third color (magenta), similarly to FIGS. 11A to 11J. FIGS. 14A to 14J are diagrams illustrating steps of the processing when the processing target color is the fourth color (yellow), similarly to FIGS. 11A to 11J.

According to the present embodiment described above, the evaluation value Ev indicating the priority for dot arrangement is calculated for each pixel based on Expression (1) including the three parameters of the gradation value I, the reference value R, and the exclusion value H. Thus, the gradation value I of each pixel can be more actively reflected on a quantization result of the pixel than in the above-described embodiments in which the evaluation value Ev is set with the two parameters of the reference value R and the exclusion value H.

For example, when a picture image is printed, it is preferable that uniformity of the whole image is preferred to the gradation value of each pixel and dots are dispersed in a unit region without overlapping as in the first and second embodiments. However, when a graphic image including characters and line drawing is printed, it may be preferable that the gradation value of each pixel is reflected on dot existence at the pixel as much as possible to prefer the sharpness and contrast of an object. When dots are arranged based on Expression (1) including the three parameters of the gradation value I, the reference value R, and the exclusion value H as in the present embodiment, the gradation value of each pixel can be reflected on dot existence at the pixel while dot overlapping between different colors is prevented. As a result, an image excellent in the sharpness and the color development characteristic can be output.

The balance between the sharpness and the color development characteristic may be adjusted by multiplying I/Imax, which prompts dot arrangement, and H/Hmax, which prevents dot arrangement, by weight coefficients Wp and Wh having a value of 1 to 0, respectively. In this case, for example, when the weight coefficient Wp is increased, an image, the sharpness and the contrast of which are maintained, can be output. When the weight coefficient Wh is increased, the ratio of exclusion between dots in different colors is increased, and an image excellent in the color development characteristic can be output.

In addition, when a weight coefficient Wr for the normalized value R/Rmax of the reference value R is prepared, the influence of an arrangement order defined by the threshold matrix can be increased by increasing the value of the weight coefficient. For example, when a prepared threshold matrix has the blue-noise characteristic with excellent dispersity, dot arrangement excellent in dispersity can be obtained. Such weight coefficients Wp, Wr, and Wh may be changed as appropriate in accordance with the ink color, the printing mode, the kind of a print medium, and the like.

According to the present embodiment, since the evaluation value Ev is derived based on the gradation value I in addition to the reference value R and the exclusion value H, the frequency of overlapping arrangement of dots of different colorants is higher than in the first and second embodiments. This may increase the granularity as compared to the first and second embodiments but increases the resistance (robustness) of the image quality against various error and fluctuation of the printing apparatus. This will be briefly described below.

For example, when the dot arrangement data is generated so that a dot of first ink and a dot of second ink are exclusive from each other but a printing positional shift occurs between a printing head for the first ink and a printing head for the second ink, some overlapping dots are generated on a print medium. When the amount of such printing positional shift varies with reciprocate scanning of the printing heads and cockling of the print medium, the number of generated overlapping dots varies with the printing positional shift amount as well, and the overlapping dots are recognized as density unevenness and color unevenness on the print medium.

However, when overlapping dots of different colorants are allowed to generate at a predetermined ratio in advance as in the present embodiment, two dots that should be printed at different positions overlap with each other at some places, but two dots that should overlap with each other are separated from each other at some places. Thus, when the printing positional shift amount varies with reciprocate scanning of the printing heads and cockling of the print medium, the ratio of overlapping dots is maintained in a constant range so that density unevenness and color unevenness are unlikely to be recognized on the print medium. Such image robustness against the printing positional shift can be adjusted by changing the above-described weight coefficient Wh.

The following describes effects of the present embodiment with reference to specific examples. For example, when eight dots are arranged in accordance with the reference value information illustrated in FIG. 11C without calculating the evaluation value Ev as in the present embodiment, the dot arrangement data as illustrated in FIG. 15A is obtained. In comparison of FIG. 15A with FIG. 11I as the dot arrangement data in the present embodiment, characteristics of the gradation data illustrated in FIG. 11A more clearly appear in FIG. 11I, which illustrates the dot arrangement data in the present embodiment, than in FIG. 15A. Thus, according to the present embodiment, the gradation value I is included in Expression (1) for calculating the evaluation value Ev, and thus characteristics of the gradation data can be more strongly reflected on a quantization result.

Figures 16A, 16B:
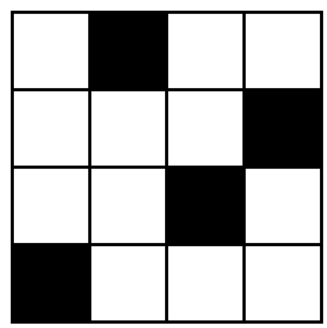
FIGS. 16A and 16B are comparison diagrams for description of the effects of the third embodiment.

The following describes effects of the exclusion value H included in Expression (1) for deriving the evaluation value Ev. For example, FIG. 16A is obtained when no term of the exclusion value H is provided in Expression (1) and the first evaluation value information is calculated in accordance with the gradation data of the second color (cyan) illustrated in FIG. 12A and the reference value information illustrated in FIG. 12C. When four dots are arranged in accordance with this evaluation value information, the dot arrangement data as illustrated in FIG. 16B is obtained.

When four dots are arranged in accordance with the reference value information illustrated in FIG. 12C, the dot arrangement data as illustrated in FIG. 16B is obtained. In comparison of FIG. 16B with FIG. 11I, which is the dot arrangement data in the present embodiment, FIG. 16B is less excellent in exclusiveness from the dot arrangement data of the first color (black) illustrated in FIG. 11I than FIG. 11I.

Specifically, according to the present embodiment, the exclusion value H included in Expression (1) for deriving the evaluation value Ev can increase the exclusiveness of the dot arrangement data of the processing target color from the dot arrangement data of ink for which the quantization processing is already completed.

In Expression (1), the first evaluation value Ev1 is calculated by performing addition and/or subtraction on a value obtained by normalizing each of the gradation value I, the reference value R, and the exclusion value H to the range of 0 to 1, but such normalization processing is not essential. The gradation value I, the reference value R, and the exclusion value H only need to be adjusted to the same range, and may be each, for example, an integer of 1 to 256 expressed in 8 bits or an integer of 1 to 65536 expressed in 16 bits.

When a region of the threshold matrix corresponding to the processing target region is used as the reference value information as in the present embodiment, the content of the reference value information is different between unit regions. Consider a case in which the target dot number D as in the present embodiment is not set and the reference value information is used as a dither matrix when dither processing is performed on the gradation data illustrated in FIG. 11A. In this case, the dot arrangement data illustrated in FIG. 11I can be obtained from the reference value information illustrated in FIG. 11C, and the dot arrangement data illustrated in FIG. 15C can be obtained from the reference value information illustrated in FIG. 15B. Accordingly, with the dot arrangement data quantized in accordance with the same gradation data illustrated in FIG. 11A, eight dots are arranged in a unit region and 11 dots are arranged in another unit region. As a result, occurrence of density unevenness and color unevenness on a print medium is concerned.

However, when the average value of gradation values included in a unit region is calculated and the number of dots to be arranged in the unit region is set based on the average value as in the present embodiment, fluctuation in the number of arranged dots between unit regions can be stabilized to some extent irrespective of variation in the content of the reference value information. FIGS. 15D and 15E illustrate the first evaluation value information and the dot arrangement data, respectively, when processing of the present embodiment is executed based on the gradation data in FIG. 11A by using the reference value information illustrated in FIG. 15B. In FIG. 15E, nine dots are arranged to express density substantially equivalent to that in FIG. 11I in which eight dots are arranged.

In the present embodiment, a different threshold matrix is prepared for each of the four ink colors to calculate the target dot number D and the evaluation value Ev as illustrated in FIGS. 11 to 14, but the threshold matrix may be common to the colors. In this case, the exclusion value information as the sum total of the dot arrangement data of already processed ink colors is information based on the threshold matrix common to all colors, and as a result, dispersity based on the threshold matrix can be obtained as the sum total over all ink colors. Thus, when dispersity increase is preferred, in particular, for example, one threshold matrix having the blue-noise characteristic may be prepared and used as the reference value information common to the colors. In this manner, a smooth image having high dispersity as the sum total over all ink colors can be output.

However, in the present embodiment, the threshold matrix does not necessarily need to be used as the reference value information. As in the first embodiment, the reference value information may be prepared as an integer of 1 to 16 (or 0 to 15) separately from the threshold matrix. In this case, the maximum value Rmax used for normalization of the reference value is 16 (or 15).

Figures 17A, 17B, 17C:
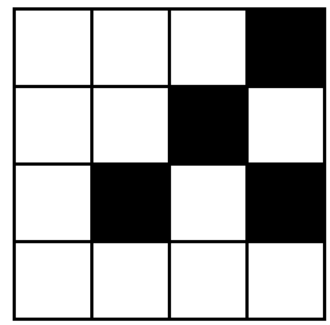
FIGS. 17A to 17C are comparison diagrams for description of effects of the present invention.

FIGS. 17A to 17C are diagrams for comparison of the present invention with a case in which the quantization processing is performed by a method of International Publication No. WO 2002/005545. As similar to FIG. 12A, FIG. 17A illustrates the gradation data of the second color (cyan) in the processing target region. FIG. 17B illustrates a threshold matrix for cyan data obtained through shift processing in accordance with the method of International Publication No. WO 2002/005545.

FIG. 17B illustrates a matrix obtained by subtracting each gradation value I indicated by the gradation data in FIG. 11A from the corresponding threshold in the matrix illustrated in FIG. 11C and incrementing the resulting value by 255 only when the value is negative. Then, when dither processing is performed in accordance with the gradation data in FIG. 17A by using the threshold matrix in FIG. 17B obtained in this manner, dot arrangement data as illustrated in FIG. 17C is obtained. In comparison of the dot arrangement data illustrated in FIG. 17C with the dot arrangement data of the second color (cyan) according to the present embodiment illustrated in FIG. 12I, exclusiveness from the dot arrangement data of the first color illustrated in FIG. 11I is less excellent in FIG. 17C than in FIG. 12I.

According to the method of International Publication No. WO 2002/005545, a dot of the first color and a dot of the second color can be arranged in a completely exclusive manner when the gradation value of the first color for which the quantization processing is performed beforehand is uniform and the gradation value of the second color for which the quantization processing is subsequently performed is uniform. However, in an actual image, the gradation value often varies between pixels to some extent as illustrated in FIG. 11A, and it is difficult to print dots of the first color and the second color in a stable exclusion relation by the method of International Publication No. WO 2002/005545.

However, in the present embodiment, unless the sum of the number of dots of the first color and the second color exceeds the number of pixels (16) in a unit region, a dot of the first color and a dot of the second color can be arranged in the unit region in a completely exclusive relation as illustrated in FIGS. 11I and 12I. Such an exclusion relation can be maintained for any unit region. Accordingly, according to the present embodiment, the frequency that dots of different colors are printed in duplication at the same position on a print medium can be further reduced as compared to International Publication No. WO 2002/005545, and an image having a higher color development characteristic can be output.

In the above, FIGS. 11 and 12 used in the present embodiment are compared with FIGS. 17A to 17C of International Publication No. WO 2002/005545 and described as effects of the present embodiment, but such effects can be also obtained in the first and second embodiments.

Modifications of First to Third Embodiments

Although the above-described embodiments describe the case in which the gradation value I is converted into binary data of "printing (1)" or "no printing (0)", the present invention is also applicable to quantization of the gradation value into three values or more. When the number of quantized values is three or more, the quantized values of each pixel can be expressed by adjusting the number and size of dots printed in an area on a print medium corresponding to one pixel.

The following specifically describes an example in which the number of quantized values is three. In this case, Imax is first adjusted to obtain a normalized value I/Imax of 0 to 2 from the gradation value I. Then, one dot is first arranged at a pixel for which the normalized value I/Imax is larger than one. In addition, a value obtained by subtracting one from the normalized value I/Imax of the pixel is set as a new normalized value of the pixel.

Thereafter, the evaluation value Ev is calculated based on the new normalized value by the method described above in the embodiments together with a pixel at which a dot is yet to be arranged, and a dot is arranged again. Then, the quantized value of a pixel at which two dots are arranged as a result is set to be "2", and two dots are printed in the corresponding area on the print medium. In addition, the quantized value of a pixel at which one dot is arranged as a result is set to be "1", and one dot is printed in the corresponding area on the print medium. Furthermore, the quantized value of a pixel at which no dot is arranged as a result is set to be "0", and no dot is printed in the corresponding area on the print medium. In this case, a quantized value of 0 to 2 may be stored in the accumulative dot information in the first and second embodiments and the dot arrangement history information in the third embodiment.

To print two dots in an area corresponding to one pixel, for example, two nozzle arrays in each of which the multiple nozzles 101 are arrayed may be prepared in the x direction for each ink color at the printing head 102 illustrated in FIG. 1B. In addition, a multipath printing method in which print scanning is performed multiple times on an identical image region of the print medium by the printing head 102 may be employed. Furthermore, binary data at higher resolution may be generated by providing index loading processing to the quantized value of three values or more and may be used as definitive print data.

When the quantized value of three values or more is expressed not in the number of dots but in the dot size, a large dot may be arranged at a pixel for which the quantized value is "2", a small dot may be arranged at a pixel for which the quantized value is "1", and no dot may be arranged at a pixel for which the quantized value is "0". In this case, the target dot number set at S503 in FIG. 5 or S1003 in FIG. 10 is a target value for the amount of ink of the processing target color to be applied in an area on the print medium corresponding to the processing target region, which is integrated for the number of dots or the dot size. The target dot number setting unit 403 in FIG. 4 is a target value derivation unit for deriving and setting such a target value.

In the above description, the target dot number D in the processing target region is set by comparing the average value of gradation values in the gradation data with each threshold in the threshold matrix, but the target dot number setting method is not limited thereto. For example, the target dot number D can be derived in accordance with Expression (3) by using a sum SUM of multiple gradation values I in the processing target region and a natural number N ($1 \le N \le 255$) set at random.

$$D=0 \text{ when } SUM<N$$

$$D=INT((SUM-N)/255)+1 \text{ when } SUM\ge N \quad \text{Expression (3)}$$

In the expression, INT(x) is a function that returns a natural number not exceeding x. For example, SUM is 1756 in the gradation data in FIG. 7A described in the first embodiment. Calculation of the target dot number by using Expression (3) with N=128 obtains:

$$D=((1756-128)/255)+1=7$$

since SUM≥N. In this example, N is the center value "128" of the gradation value I, but N is preferably set at random within a range not largely different from the center value. In this manner, the target dot number for the processing target region can be obtained without storing a threshold matrix having a large size in the memory.

In the above description, the first, second, third, and fourth colors are set as black, cyan, magenta, and yellow, respectively, in accordance with the order of colors stored in the quantization order information 408, but the present invention is not limited to this configuration. However, for an ink color at a later order, the reference value information is more unlikely to be reflected on the evaluation value information than the exclusion value, and thus dispersity tends to be lost. For this reason, in the present embodiment, processing is performed in the descending order of the optical density of dots printed on a print medium, and yellow, with which the optical density is lowest, is applied as the fourth color for which dispersity is most likely to be lost.

However, the color order of processing may be changed for each unit region. Particularly when the reference value information of a dispersion type is used, repetitive pattern and texture are visually recognized in some cases due to processing performed in the same color order for all unit regions. In such a case, the pattern and texture can be made unnoticeable across the whole image by switching the color order of processing for each unit region. For example, the first to third colors may be sequentially switched between black, cyan, and magenta while yellow, which is visually unnoticeable, is fixed as the fourth color.

In addition, the color order of processing may be set based on image data. For example, when the hue of the processing target region indicated by the R'G'B' data obtained at S301 in FIG. 3 is close to G (green), the first color may be set to be cyan, the second color may be set to be yellow, the third color may be set to be black, and the fourth color may be set to be magenta.

In the flowcharts described with reference to FIGS. 5 and 10, the processing target region is set, and then the processing target color is set for the set processing target region, but the order of these settings may be opposite. Specifically, the processing target color may be first set, the quantization processing for the set processing target color may be performed for all unit regions, and thereafter, the processing target color may be switched to the next ink color. However, in this case, a memory region for storing the accumulative dot number information and the dot arrangement history information needs to be prepared for all unit regions. Thus, the order in accordance with each of the flowcharts described with reference to FIGS. 5 and 10 is more preferable for saving of such a memory region.

In the above description, the reference value information for the processing target region is acquired based on the threshold matrix and the reference value information stored in the memory in advance, but the reference value information may be generated based on the gradation data or the like when the quantization processing is performed. For example, the gradation data in the processing target region may be referred to, and the reference value of 1 to 16 may be sequentially allocated to a pixel for which the gradation value is largest. In addition, after the gradation data is provided with predetermined edge processing and filtering processing, the reference value of 1 to 16 may be sequentially allocated to a pixel for example the gradation value is largest. In this manner, the reference value R is generated in accordance with parameters such as image characteristics (edge and ink amount) and then exclusion processing is performed based on the reference value R, and thus color development defect due to dot overlapping can be reduced while the image characteristics are appropriately reproduced.

In the above description, 4×4 pixels are associated with a unit region by referring to FIG. 6, but the unit region according to the present invention is not limited to such a size and a shape. The unit region may have a larger size, and the number of pixels in the x direction may not be equal to the number of pixels in the y direction. With a smaller number of pixels included in the unit region, the memory capacity used for processing can be reduced and the gradation value I and the image characteristics are more likely to appear on an output image. With a larger number of pixels per unit region, exclusiveness in the unit region and thus the color development characteristic can be improved to reduce the granularity.

However, when the size of the unit region is n×m pixels, the numbers of pixels in the x direction and the y direction included in image data are preferably integer multiples of n and m. Thus, when such a condition is not satisfied, white data is preferably appended in predetermined regions at end parts of the image data in the x direction and the y direction so that the numbers of pixels in the x direction and the y direction become integer multiples of n and m.

Fourth Embodiment

Figure 18:
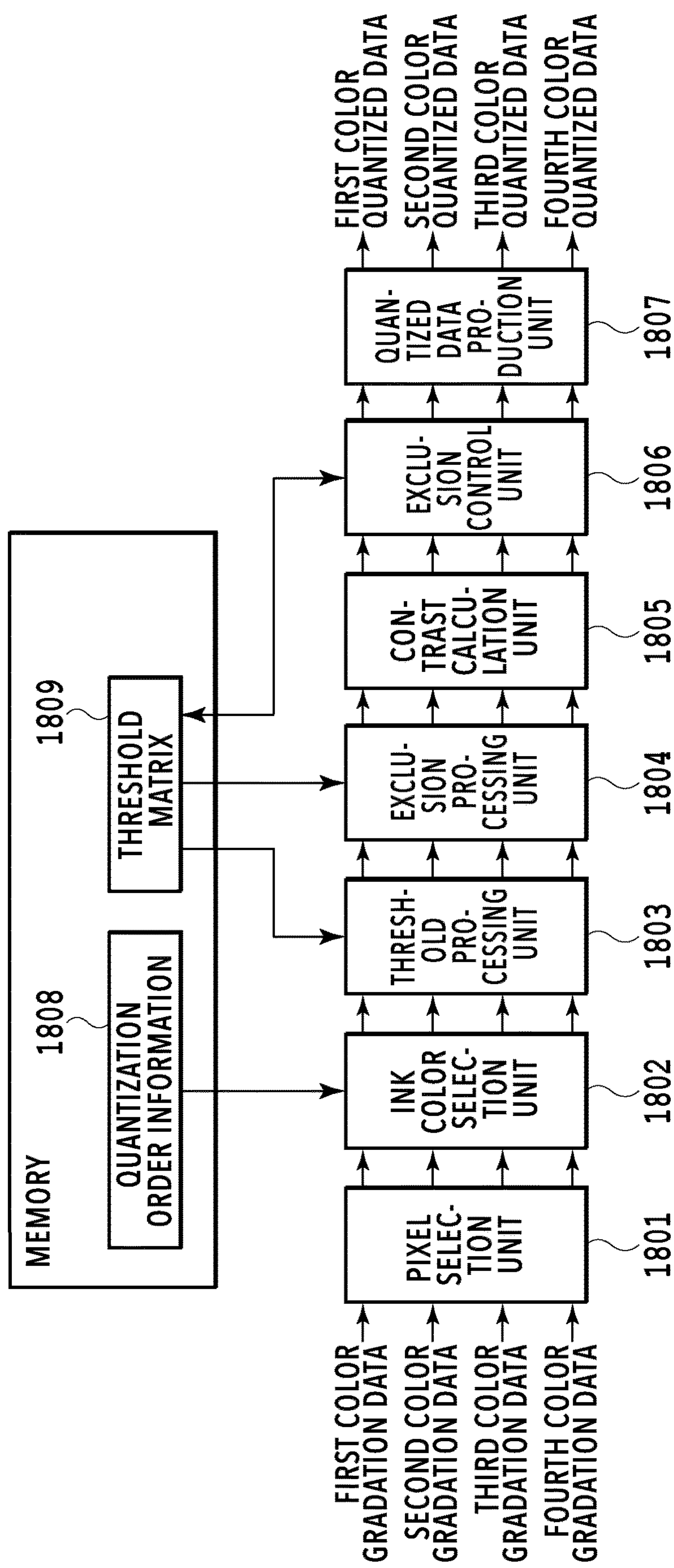
FIG. 18 is a block diagram for description of a software configuration in a fourth embodiment.

In the present embodiment as well, the image processing apparatus described with reference to FIGS. 1 to 3 is used. FIG. 18 is a block diagram for description of a functional configuration in quantization processing of a fourth embodiment. The following provides simple description on the function of each block. In the present embodiment, the KCMY data generated through the ink color separation processing at S302 is input to a pixel selection unit 1801 for each ink color. In FIG. 18, the first color is black (K), the second color is cyan (C), the third color is magenta (M), and the fourth color is yellow (Y).

The pixel selection unit 1801 sets, as an interest pixel, one pixel from the gradation data including multiple pixels. Then, the gradation value of each color at the set interest pixel is provided to an ink color selection unit 1802. In other words, in this example, having set the interest pixel, the pixel selection unit 1801 outputs the gradation value for each of the four colors at the interest pixel to the ink color selection unit 1802.

The ink color selection unit 1802 refers to quantization order information 1808 stored in the memory, selects the processing target color from among the first to fourth colors, and provides the gradation data for the selected ink color in the processing target region to a threshold processing unit 1803.

The threshold processing unit 1803 executes quantization processing for each pixel by using a threshold matrix 1809 stored in the memory in advance. FIG. 20 is a diagram illustrating part of the threshold matrix 1809 used in the present embodiment. In the threshold matrix 1809, multiple thresholds having values different from each other are arranged at random in a manner associated with the pixels. When the threshold matrix 1809 is associated in a tile form with a processing target image, each pixel in the image is associated with any of the thresholds. The threshold processing unit 1803 uses the same threshold matrix 1809 for the gradation data of all the C, M, Y, K colors in association with the same positions.

An exclusion processing unit 1804 controls thresholds for a color to be processed next so that overlapping of dots of different colors at the interest pixel is prevented as much as possible. Thus, the exclusion processing unit 1804 updates the threshold at the interest pixel each time the threshold processing unit 1803 quantizes the gradation value at the interest pixel.

A contrast calculation unit 1805 calculates a contrast value in correlation with the degree of contrast in an adjacent region including the interest pixel. The contrast is high when the gradation value difference is large in the adjacent region, and the contrast is low when the gradation value difference is not so large. An exclusion control unit 1806 controls the degree of an exclusion effect by the exclusion processing unit 1804.

A quantized data production unit 1807 generates quantized data printable by the printing apparatus 100 based on the dot arrangement data generated by the threshold processing unit 1803, and outputs the generated quantized data to the printing apparatus 100 as print data. The quantized data of colors is equivalent to the K'C'M'Y' data described with reference to the flowchart in FIG. 3.

The following description is made based on an assumption that a single dot size is applied and 1-bit quantized data indicating "ON/OFF" of a dot for each pixel is generated for each of CMYK.

Figure 19:
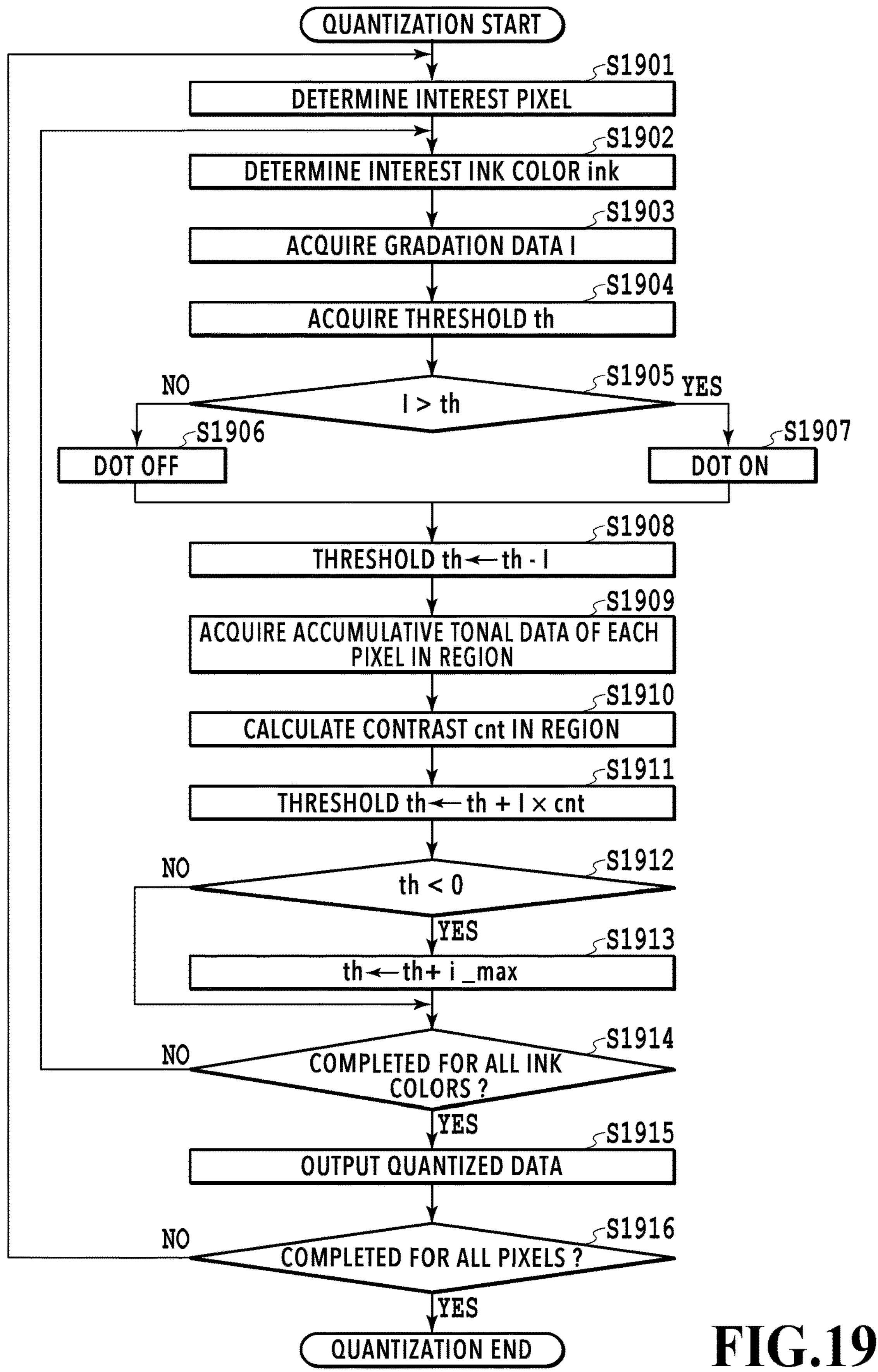
FIG. 19 is a flowchart for description of the process of quantization processing in the fourth embodiment.

FIG. 19 is a flowchart for description of the process of processing executed by the CPU 201 by using each block illustrated in FIG. 18 in the quantization processing at S303. The following describes, in detail with reference to FIGS. 20, 21, and 22A to 22D, the quantization processing executed in the present embodiment in accordance with the flowchart illustrated in FIG. 19.

When the present processing is started, first at S1901, the pixel selection unit 1801 selects, as an interest pixel, a processing target pixel (x, y) from an image as a printing target.

Subsequently at S1902, the ink color selection unit 1802 sets a processing target color from among black (first color), cyan (the second color), magenta (the third color), and yellow (fourth color). The order of colors set as the processing target color is stored in advance in the memory of the HDD 203 as the quantization order information 1808, and the ink color selection unit 1802 sets a new color in accordance with the color order indicated by the quantization order information 408 each time the present process is performed. In this example, the order of quantization is K→C→M→Y.

At S1903, the threshold processing unit 1803 acquires the gradation value I (x, y) of the processing target color for the interest pixel in the gradation data obtained by the color separation processing (step S302 in FIG. 3). In the present embodiment, the gradation data is 8-bit data in which a gradation value of 0 to 255 is stored for each pixel.

At S1904, the threshold processing unit 1803 acquires a threshold th used for the quantization processing of the interest pixel. The threshold for the interest pixel (x, y) is referred to as the threshold th (x, y).

Subsequently at S1905, the threshold processing unit 1803 determines an output value indicating "ON" and "OFF" of a dot at the interest pixel through magnitude comparison between the gradation value I (x, y) and the threshold th (x, y). More specifically, in a case of I (x, y)>th (x, y), the process proceeds to S1907, and the threshold processing unit 1803 sets "ON" (output value=1) to the dot at the interest pixel (x, y) at S1907. In a case of I (x, y) th (x, y), the process proceeds to S1906, and the threshold processing unit 1803 sets "OFF" (output value=0) to the dot at the interest pixel (x, y) at S1906.

Subsequently at S1908, the exclusion processing unit 1804 changes the threshold th (x, y) for the interest pixel, which is used for the next processing target color. More specifically, the exclusion processing unit 1804 updates the threshold th (x, y) to a threshold th' (x, y) so that a dot of another color is unlikely to be arranged at the interest pixel (x, y) for which "dot ON" is set at S1907. In the present embodiment, the exclusion processing unit 1804 updates the threshold by using Expression (4).

$$th' = th(x,y) - I(x,y) \quad \text{Expression (4)}$$

When the threshold th' thus calculated is incremented by the maximum value "255" of the gradation data and used for the quantization processing, the threshold th' is larger than the original threshold th for a pixel at which a dot is arranged, and thus another dot is unlikely to be arranged at the pixel in the subsequent processing, thereby achieving the exclusion effect. The exclusion processing unit 1804 stores the new threshold th (x, y) in the memory. The exclusive arrangement of dots of different colors at the interest pixel through such threshold update will be described later.

Figure 21:
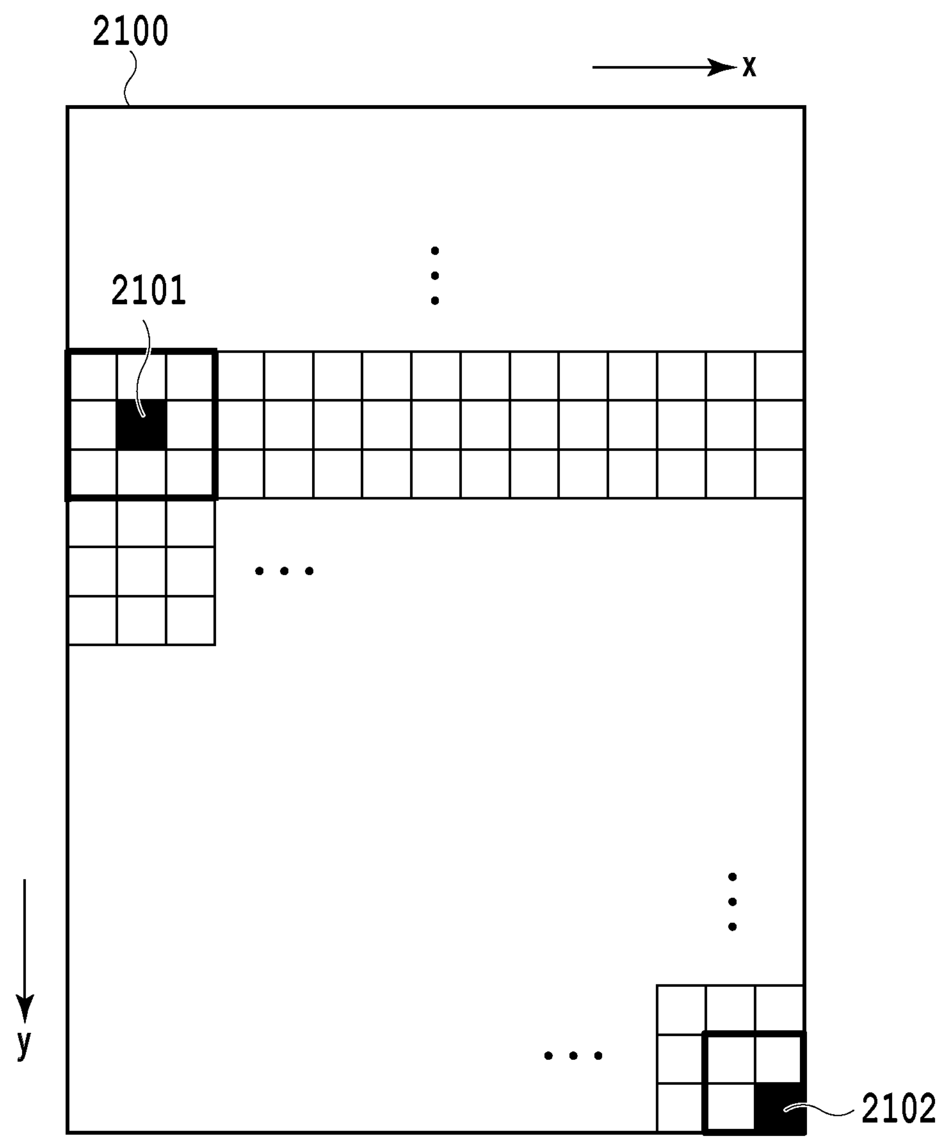
FIG. 21 is a diagram illustrating an exemplary processing region.

Subsequently at step S1909, the contrast calculation unit 1805 calculates accumulative gradation data S for each pixel included in a predetermined region centered at the interest pixel. For example, the interest pixel is a pixel 2101 in an input image 2100 as illustrated in FIG. 21. In this case, the contrast calculation unit 1805 sets a 3×3-pixel block centered at the interest pixel 2101 to be a processing region. For example, when a pixel is positioned at an edge of the image like a pixel 2102 and the processing region of 3×3 pixels cannot be obtained, the processing region is set to be a smaller block of 2×2 or the like. In the present embodiment, the contrast calculation unit 1805 calculates, as the accumulative gradation data S, the sum total of the gradation value of a color processed at the interest pixel and the gradation value I of the processing target color.

For example, the interest target color at the interest pixel is K. In the present embodiment, since the order of quantization is K→C→M→Y, no color is processed at the interest pixel, and the accumulative gradation data S of each pixel in the processing region is a gradation value Ik for K ink. When the interest target color is C ink, the sum of the gradation value Ik of K ink as a color processed at the interest pixel and a gradation value Ic of C ink as the processing target color is calculated as the accumulative gradation data S for each pixel in the processing region. Similarly, when the processing target color is M ink at the interest pixel, the sum of the gradation value Ik, the gradation value Ic, and a gradation value Im is calculated as the accumulative gradation data S for each pixel in the processing region. In addition, when the processing target color is Y ink at the interest pixel, the sum total of the gradation values Ik, Ic, Im, and Iy is calculated as the accumulative gradation data for each pixel in the processing region. FIGS. 22A to 22C illustrate exemplary gradation values Ik, Ic, and Im of K, C, and M inks for each pixel in the processing region. When the processing target color is M ink at the interest pixel, the accumulative gradation data S of each pixel calculated at S1909 is a value illustrated in FIG. 22D.

Subsequently at step S1910, the contrast calculation unit 1805 calculates a contrast value cnt indicating contrast in the processing region based on the accumulative gradation data S of each pixel in the processing region. Specifically, in the present embodiment, the contrast value cnt is calculated by using Expression (5) below. The maximum and minimum values among the accumulative gradation data S of the pixels in the processing region are represented by max_S and min_S, respectively.

$$cnt = (max\_S - min\_S)/(max\_S + min\_S) \quad \text{Expression(5)}$$

However, cnt is zero when max_S is zero. The contrast value cnt calculated by using Expression (5) is a value of 0 to 1 and larger for higher contrast in the processing region.

At S1911, the exclusion control unit 1806 performs processing of reducing the strength of exclusion processing for the interest pixel based on the contrast cnt in the processing region for the interest pixel. More specifically, the threshold th (x, y) for the interest pixel is further updated so that the threshold change at S1908 is canceled as the contrast value cnt in the processing region is larger (contrast is higher). In the present embodiment, the exclusion control unit 1806 calculates a new threshold th" by using Expression (6) below and stores the threshold th" in the memory as a threshold for the interest pixel.

$$th'' = th'(x,y) + I(x,y) \times cnt \quad \text{Expression (6)}$$

In Expression (6), "I (x, y)×cnt" functions as an exclusion control value for controlling the degree of exclusion. Specifically, the threshold th' for exclusively arranging a dot is maintained for a pixel having a small contrast value (low contrast) in an adjacent region. The threshold th' is updated for a pixel having a large contrast value (large contrast) in the adjacent region. Particularly when the contrast value of the interest pixel is one, the threshold is updated to the value of the original threshold th. This processing will be described later in detail.

Subsequently at S1912, the exclusion control unit 1806 determines whether the threshold th" (x, y) is smaller than zero. When the threshold th" (x, y) is smaller than zero, the process proceeds to S1913. At S1913, the exclusion control unit 1806 updates the threshold of the interest pixel by setting, as a new threshold th"', a value obtained by incrementing the threshold th" (x, y) by an upper limit value i_max (in this example, 255) in the gradation data. When the threshold th" (x, y) is equal to or larger than zero, the process skips S1913 and proceeds to S1914.

Subsequently at S1914, the ink color selection unit 1802 determines whether the quantization processing for all colors at the interest pixel is executed in accordance with a quantization order information 1808. When the quantization processing for all colors at the interest pixel is completed, the process proceeds to S1915. When there is a color yet to be processed, the process proceeds to S1902 to select the processing target color at the interest pixel and continue the quantization processing at the interest pixel.

At S1915, the quantized data production unit 1807 outputs the quantized value of each color of the interest pixel to the RAM 212. At S1916, the pixel selection unit 1801 determines whether the quantization processing is executed for all pixels of an input image. For example, when pixels are selected sequentially from the upper-left corner, whether the quantized data of a pixel closest to the lower-right corner is produced may be determined. As a result of the determination, when the quantization processing is executed for all pixels of the input image, the quantization processing is ended. When there is a pixel for which the quantized data is yet to be produced, the process returns to S1901 to newly select the interest pixel and continue the quantization processing.

Figures 23A, 23B, 23C, 23D, 23E, 23F:
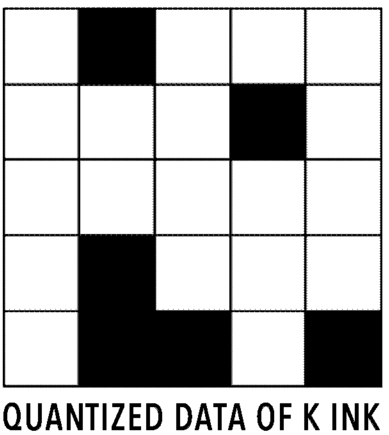
FIGS. 23A to 23F are diagrams illustrating exemplary K-ink quantization processing.

The following describes a specific example of the quantization processing in the present embodiment with reference to FIGS. 23A to 23F and 24A to 24D. FIG. 23A illustrates the gradation data of K ink for a partial region in an input image. Each rectangle represents one pixel, and a gradation value is stored in each pixel. FIG. 23B illustrates thresholds for the partial region illustrated in FIG. 23A. FIG. 23C illustrates a result of K-ink quantization processing. In FIG. 23C, each pixel colored in black indicates that a dot of K ink (hereinafter also simply referred to as a K dot) is arranged at the pixel (the output value is “1”). Since K ink is the first color, the output value is “1” for each pixel for which the gradation value is larger than the corresponding threshold. When the K-ink quantization processing is executed, at least some of the thresholds for the pixels are updated through the processing at S1908 to S1914. FIG. 23D illustrates the threshold th' set by Expression (4) at S1908. For each pixel, a value obtained by subtracting the gradation value from the threshold is stored as the threshold th'. The output value of “1” means that the gradation value of the pixel is larger than the threshold. Thus, the threshold th' is negative for a pixel for which the output value is “1”.

FIG. 23E illustrates the contrast value cnt of each pixel calculated at S1910. However, the processing region for which the contrast value is calculated is a 3×3-pixel region centered at the interest pixel. The contrast value is small (0.00) for a pixel that is flat (has no pixel value change) and has a low contrast in an adjacent region. The contrast value is larger for a pixel having higher contrast in the adjacent region.

FIG. 23F illustrates the threshold th" calculated based on the exclusion control value for controlling the strength of the exclusion processing. However, th" is incremented by i_max=255 when th" is smaller than zero. As a result of the exclusion control, for a pixel, such as the lower-right pixel in the partial region, at which a K dot is arranged and the contrast is low, a value larger than the original threshold “19” is employed as a threshold. In addition, for a pixel, such as the two lowest pixels on the second column, at which K dot is arranged and the contrast is high, a value smaller than the original threshold is employed to reduce the strength of the exclusion processing. In addition, for a pixel, such as the upper-right pixel or the pixel on the second column and the second row, at which no K dot is arranged, a value smaller than the original threshold is employed.

Figures 24A, 24B, 24C, 24D:
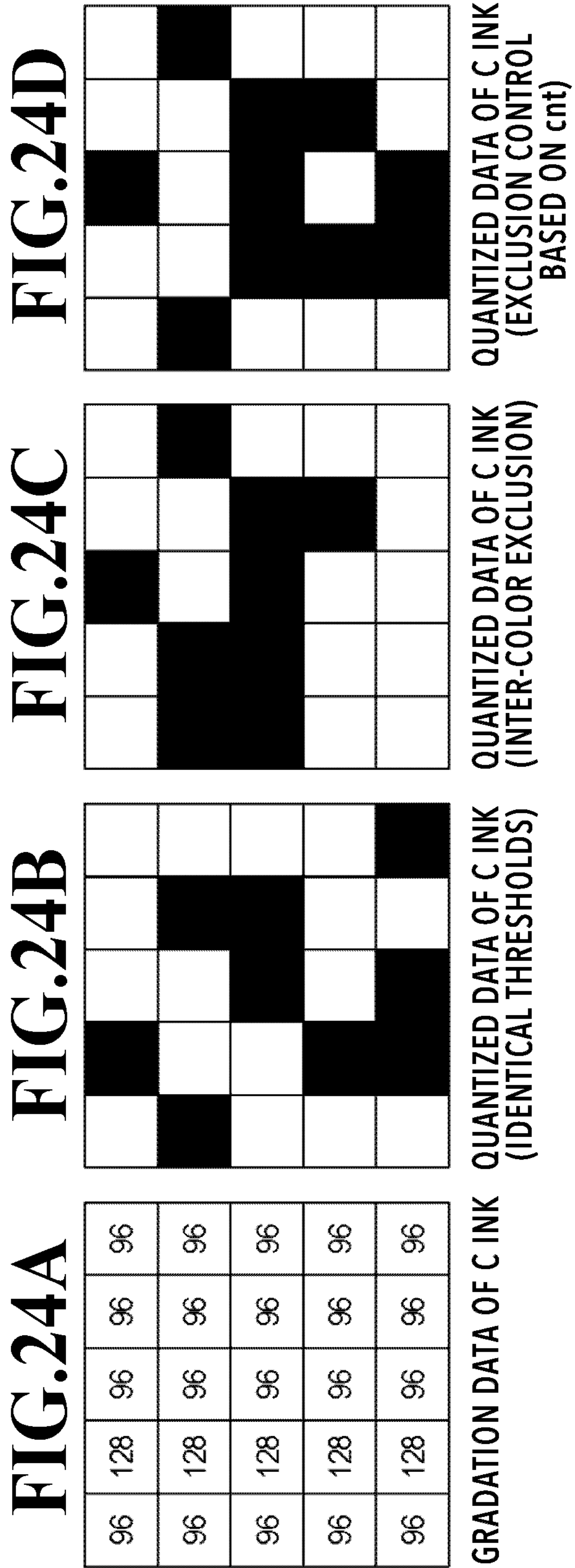
FIGS. 24A to 24D are diagrams illustrating the process of C-ink quantization.

Subsequently, C ink is selected as the processing target color. FIG. 24A illustrates the gradation data of C ink in a partial region same as the partial region illustrated in FIG. 23A.

In the present embodiment, each gradation value of C ink illustrated in FIG. 24A is quantized by using not the thresholds illustrated in FIG. 23B but thresholds after the exclusion control illustrated in FIG. 23F. FIG. 24D illustrates a result of the quantization in the present embodiment. For description of the effects of the present embodiment, FIG. 24B illustrates a result of quantization by using the thresholds illustrated in FIG. 23B. FIG. 24C illustrates a result of quantization by using the threshold th' after the exclusion processing. In FIGS. 10B to 10C, a dot of C ink (hereinafter referred to as a C dot) is arranged at each pixel colored in black.

As illustrated in FIGS. 23C and 24B, when the gradation value of each color is quantized by using the same thresholds, a C dot is formed at each pixel at which a K dot is formed. In other words, the rate of overlapping between dots of different colors is large when identical thresholds are used for different ink colors. When characteristics of the gradation data are similar like a line of one pixel width on the second column from the left in each of FIGS. 23A and 24A, in particular, the rate of dot overlapping is likely to be high through the quantization by using the same thresholds. However, when a printing apparatus 100 discharges ink onto a print medium based on the quantized data, dot overlapping and paper white exposure both occur in a flat region. As a result, the contrast is high despite of the flat region, and the granularity degrades due to overlapping dots, and accordingly, the image quality is lost in some cases. In the partial region illustrated in FIG. 24B, the region is flat on the three right columns, and image degradation due to dot overlapping potentially occurs. In addition, paper white increases due to increase of the number of overlapping dots, and desired density cannot be obtained in some cases.

Quantization data illustrated in FIG. 24C is obtained when the gradation value of each pixel is quantized by using the threshold th' after the exclusion processing illustrated in FIG. 23D. For the exclusion effect as described above, th' is incremented by i_max=255 to perform the quantization when the threshold th' is smaller than zero. As illustrated in FIGS. 23C and 24C, when the threshold th' after the exclusion processing is used, no C dot is formed at a pixel at which a K dot is formed. In other words, dots of different colors are exclusively arranged due to the threshold change at S1908. Through such exclusive arrangement of dots of different colors, degradation of the granularity can be reduced in a flat region.

However, it is not preferable in some cases to exclusively arrange dots of different colors in a region in which the contrast is high. For example, in the gradation data illustrated in FIGS. 23A and 24A, gradation values on the second column from the left are larger than gradation values on the other columns, and accordingly, a line of K and C is formed.

However, when the printing apparatus 100 discharges ink onto a print medium based on the C-ink quantized data illustrated in FIG. 24C, there is no dot at which K ink and C ink overlap with each other in a region in which a high-density line due to K and C overlapping should be formed. As a result, K and C dots are arranged in dispersion, and thus the density is flat across the partial region. As a result, a line of K and C is unlikely to be perceived on the print medium.

Thus, in the present embodiment, the processing of controlling the degree of exclusion between dots of different colors for each pixel based on the contrast at S1911 is performed. FIG. 24D illustrates, as thresholds after the exclusion control, C-ink quantized data obtained by using the threshold matrix after the exclusion control illustrated in FIG. 23F. As illustrated in FIGS. 23C and 24D, the line of K and C is reproduced with dots overlapped near the line of K and C along which the contrast is high, but C and K dots are exclusively arranged in a uniform region on the right side.

In this manner, in the present embodiment, the inter-color exclusion processing and the strength of the exclusion processing are controlled. The control is performed so that dots of different colors are likely to overlap with each other in a region in which the contrast is high, and dots of different colors are unlikely to overlap with each other in a region in which the contrast is low. Accordingly, an image at high quality can be achieved when dots of different colors are appropriately printed in an overlapping manner on the print medium.

The processing region for which the contrast value cnt is calculated is not limited to 3×3 pixels. The interest pixel may not be positioned at the center, and the contrast cnt may be calculated for a 4×4 region with the interest pixel positioned at the upper-left corner. Alternatively, the processing region may not be a continuous region but may be a staggered lattice or a processing region in which calculation is performed on pixels on odd-numbered or even-numbered columns. In addition, another method other than the calculation method by using Expression (5) may be applied as the method of calculating the contrast value cnt. For example, the contrast value cnt may be calculated based on a histogram of the accumulative gradation data S. Specifically, a kurtosis may be calculated from the histogram in a predetermined region centered at the interest pixel, and the contrast cnt may be set to be higher as the kurtosis is smaller.

Fifth Embodiment

The fourth embodiment describes the method of controlling the degree of inter-color dot exclusion in a method in which an identical threshold matrix is used for the gradation data of each color. The present embodiment describes a method of controlling the degree of exclusion between different colors when different threshold matrices are used by calculating the number of dots by using an average value in a predetermined region and then determining arrangement of the number of dots. Any component same as that in the fourth embodiment will be described by using the same name, and detailed description thereof will be omitted.

Figure 25:
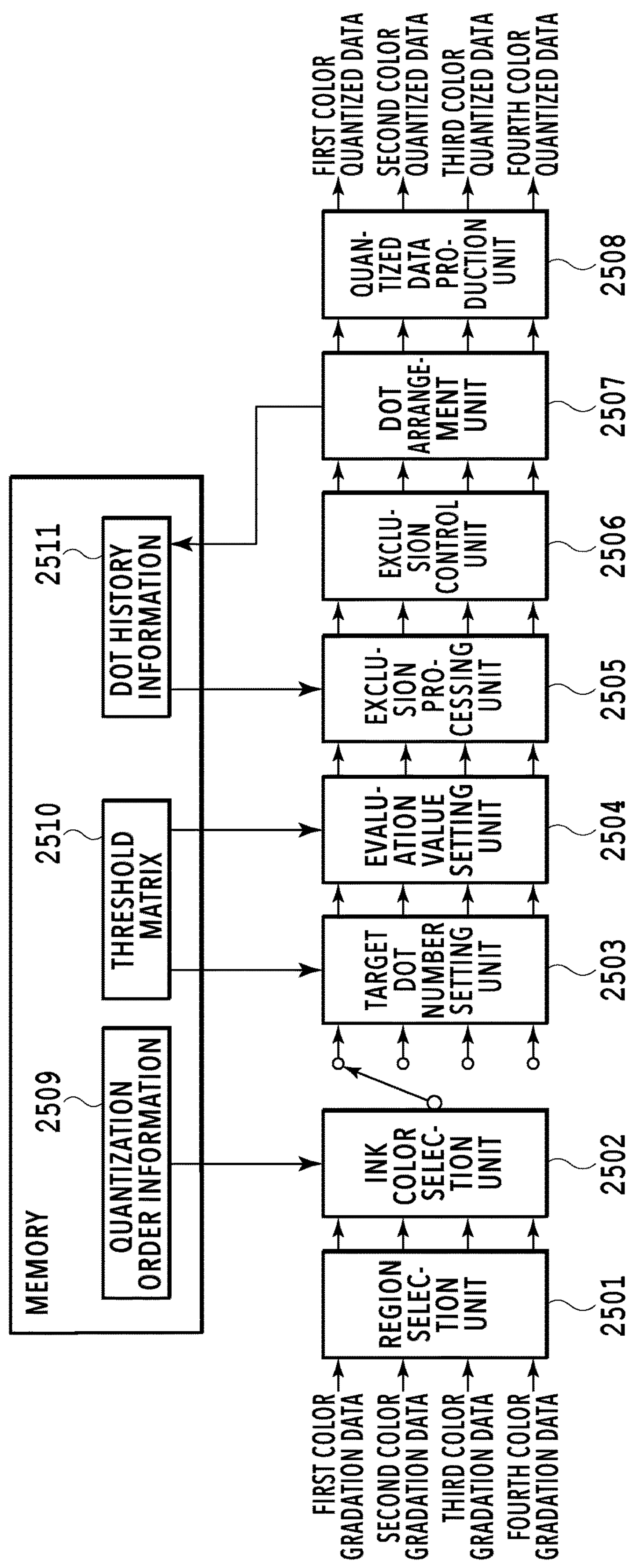
FIG. 25 is a block diagram for description of a software configuration in a fifth embodiment.

FIG. 25 is a block diagram for description of a functional configuration in the quantization processing of the present embodiment. A region selection unit 2501 divides the gradation data including multiple pixels into multiple unit regions, and sets one of the unit regions as a processing target region. In this case, the region selection unit 2501 divides the gradation data of each color into multiple unit regions at the same positions.

An ink color selection unit 2502 determines a processing target ink color for each region.

A threshold matrix 2510 for each ink color is stored in the memory. Dot history information 2511 stores output values of pixels of each color in a unit region. Thus, the dot history information 2511 indicates, for each pixel in the processing target region, dot existence for each ink color determined beforehand. In the present embodiment, the number of ink colors is four, and thus the dot history information 2511 is capable of storing output values of the unit region for three colors.

A target dot number setting unit 2503 sets, for each color, the target number D of dots to be arranged in the processing target region. The target dot number is defined as in the first embodiment.

An evaluation value setting unit 2504 sets an evaluation value H for each pixel included in the processing target region of the processing target color based on the gradation data of the processing target region, thresholds for the processing target region, and the dot history information. A detailed calculation method will be described later. A dot arrangement unit 2507 determines dot arrangement in the processing target region based on the target dot number and the evaluation value of each pixel. A quantized data production unit 2508 produces and outputs quantized data of an image.

Figure 26:
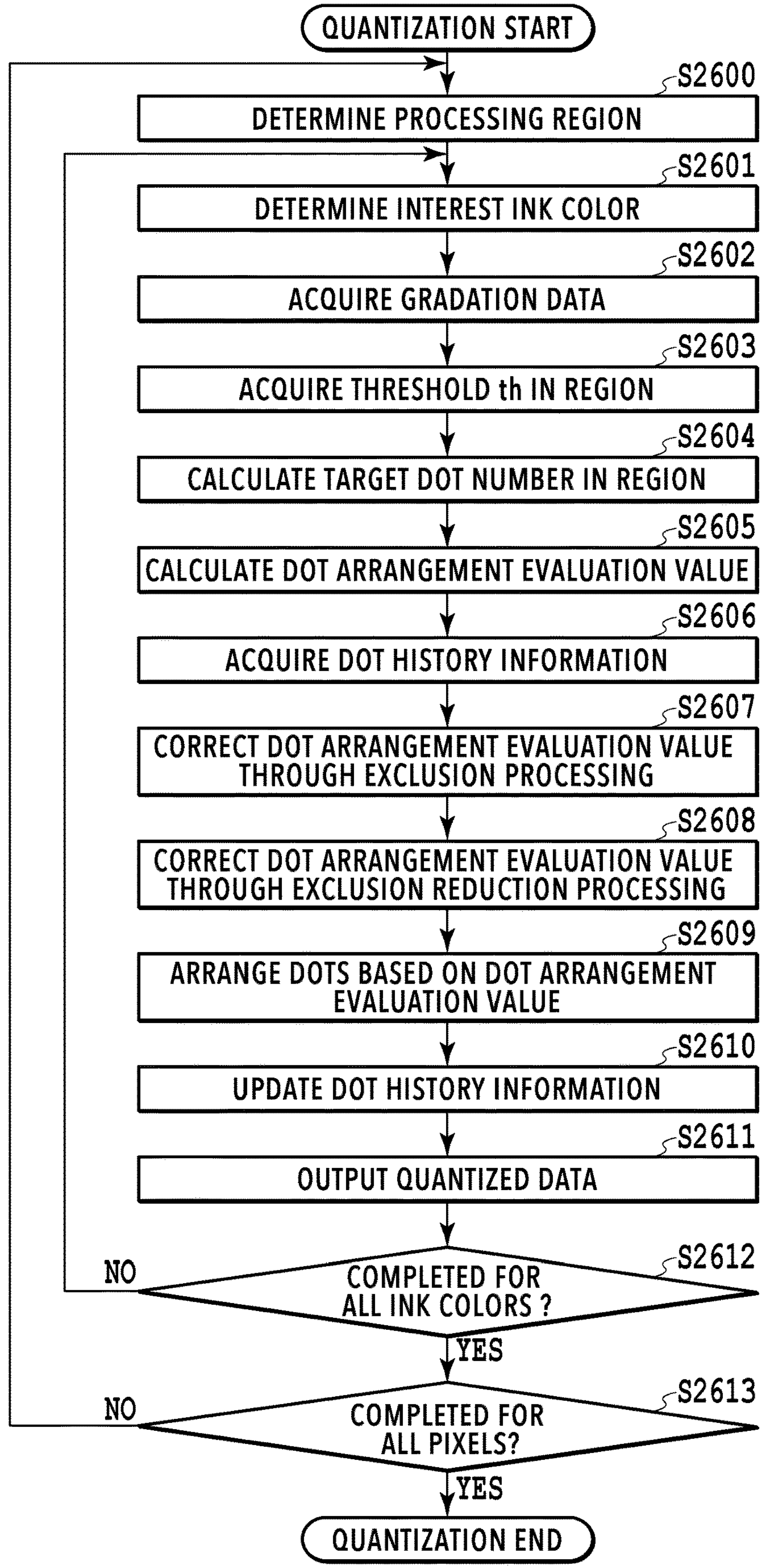
FIG. 26 is a flowchart for description of the process of quantization processing in the fifth embodiment.

FIG. 26 is a flowchart for description of the process of processing executed by the CPU 201 by using each block illustrated in FIG. 25 in the quantization processing at S303.

First at S2600, the region selection unit 2501 sets, as a processing target region, one unit region from an image region as a printing target. Definition and an installation method of the processing target region are same as those in the first embodiment described with reference to FIG. 6, and thus description thereof is omitted.

When the processing target region is set at S2600, the ink color selection unit 2502 sets a processing target color from among black (first color), cyan (the second color), magenta (the third color), and yellow (fourth color) based on quantization order information 2509 at S2601.

Figures 27A, 27B, 27C, 27D:
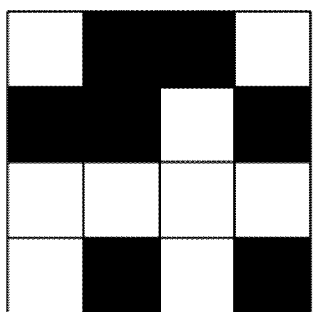
FIGS. 27A to 27D are diagrams illustrating a specific example of quantization processing.

Subsequently at S2602, the target dot number setting unit 2503 loads, onto the memory, the gradation data of the processing target color of the processing target region among the gradation data obtained through the ink color separation processing (S302 in FIG. 3). FIG. 27A illustrates exemplary gradation data loaded at S2602. The gradation value I of 0 to 255 is associated with each of 4×4 pixels included in the processing target region 701. At S2603, the target dot number setting unit 2503 acquires the threshold th (x, y) for each of the 16 pixels included in the processing target region from the threshold matrix 2510 of the processing target color. FIG. 27B is a diagram illustrating part of the threshold matrix of the processing target color. The target dot number setting unit 2503 reads, from the memory, 16 thresholds at positions corresponding to the processing target region in the threshold matrix 2510.

Subsequently at S2604, the target dot number setting unit 2503 sets, based on the gradation data acquired at S1202 and the threshold th (x, y) acquired at S1203, the number of dots to be arranged in the processing target region. Specifically, an average value obtained by dividing the sum total SUM of the gradation data in the processing region by the pixel number "16" is compared in magnitude with each threshold in the processing target region, and the number of pixels for which the average value is larger than the threshold is set as the number of dots. In the present embodiment, the threshold th is acquired from the threshold matrix different for each processing target color. For example, in a case of the processing target region illustrated in FIG. 27A, the target dot number setting unit 2503 first calculates the average value "109.75" (=1756/16) of gradation values in the processing target region. Subsequently, the average value is compared with each threshold, and the number of pixels for which the average value is larger than the threshold, the number being seven, is calculated as the number of dots in the processing target region.

Subsequently at S2605, an evaluation value setting unit 2504 calculates an evaluation value E for evaluating the priority for dot arrangement for each of the 16 pixels in the processing target region. The evaluation value E is a real number indicating that a dot is arranged in priority as the value is larger. Specifically, the evaluation value setting unit 2504 calculates the evaluation value E of each pixel based on Expression (7) below.

$$E = I/I\_max - th/th\_max \qquad \text{Expression (7)}$$

In the expression, I represents the gradation value of the interest pixel, and I_max represents the upper limit value of the gradation data. For example, I_max is 255 when the gradation data is of 8 bits, and I_max is 65535 when the gradation data is of 16 bits. Accordingly, I/I_max is a real number of 0 to 1, and a dot is more likely to be arranged as the value is larger. In addition, th represents a threshold for the interest pixel, and th_max represents the upper limit value of the threshold. For example, th_max may be 254 when the threshold is 0 to 254. In this case, th/th_max is a real number of 0 to 1, and a dot is more unlikely to be arranged as the value is larger.

Subsequently at S2606, an exclusion processing unit 2505 acquires, for each of the 16 pixels in the processing target region, a dot accumulation value at the pixel from dot history information 1111 stored in the memory.

For example, when the processing target color is C, the dot history information 2511 stores output values of K ink for which processing is already performed. Similarly, when the processing target color is M, the dot history information 2511 stores the sum of output values of K ink and output values of C ink, or when the processing target color is Y, the dot history information 2511 stores the sum of output values of K, C, and M ink. When the processing target color is K ink, there is no ink color for which processing is already performed, and thus the exclusion processing unit 2505 acquires nothing from the dot history information 2511.

Subsequently at S2607, the exclusion processing unit 2505 corrects the evaluation value E of each pixel based on the dot history information 2511. Specifically, the exclusion processing unit 2505 calculates an evaluation value E' after the exclusion processing by using Expressions (8) and (9).

$$E' = E - H/H \max \qquad \text{Expression (8)}$$

$$\text{where } H = \Sigma(wi \times Di) \qquad \text{Expression (9)}$$

In Expression (8), H represents the exclusion control value calculated from the history information, and is a real number indicating that a dot is more unlikely to be arranged as the value is larger. In the present embodiment, the exclusion control value H is larger for a pixel at which a larger number of dots are arranged at higher density.

In Expression (9) above, i represents a number indicating the processing order of the processing target color. For example, since the processing order is K→C→M→Y in the present embodiment, i is one when the processing target color is K, and i is two when the processing target color is C. In addition, wi represents a weight set in advance for the i-th ink color. In the present embodiment, the weight is set to be larger for an ink color having a higher density. Specifically, the weights for the ink colors satisfy K:C:M:Y=4:2:2:1. In other words, w1 is "4", w2 is "2", w3 is "2", and w4 is "1". When the weights are determined in this manner, the exclusion control value H is calculated to be larger as dots are arranged at a higher density.

In addition, Di represents the number of dots of the i-th ink color. For example, when a dot of K ink is arranged at the interest pixel, D1 is "1". In addition, E represents a sum total up to (i−1). However, H is "0" when i is "1". The exclusion control value H calculated as described above is calculated in accordance with the number of already arranged dots and the density of arranged dots. The value is larger when the number of dots is larger or the density of arranged dots is higher.

In addition, H_max represents the maximum value of the exclusion control value H in the processing region. The exclusion control value H in the processing region is normalized to the range of 0 to 1 by dividing the exclusion control value H by H_max. In Expression (8), E' is set to be E when H_max is "0". In other words, when the processing target color is the first color, no dot is arranged yet, and thus the evaluation value E is not corrected.

Subsequently at S2608, an exclusion control unit 2506 corrects, based on the accumulative gradation data S at each pixel, the evaluation value E' again to cancel the effect of correction of the evaluation value at step S2607. Specifically, the exclusion control unit 2506 calculates an evaluation value E" after the exclusion control for each pixel by using Expression (10) below.

$$E'' = E' + S/S\_max \qquad \text{Expression (10)}$$

$$\text{where } S = \Sigma(wi \times Ii) \qquad \text{Expression (11)}$$

In the expression, the accumulative gradation data S is a weighted sum of the gradation value I of an ink color for which processing is already performed. For example, when the processing target color is K, the accumulative gradation data S of each pixel is zero. In addition, when the processing target color is C ink, the product of the gradation value Ik of K ink and the weight w1 for K ink is acquired as the accumulative gradation data S for each pixel. Similarly, when the processing target color is M ink, "Ik×w1+Ic×w2" is acquired for each pixel.

In Expression (10), S_max represents the upper limit value of the accumulative gradation data S in theory. For example, when w1 is "4" and the gradation data is 8-bit data having a value of 0 to 255, the value of S_max at i=2 is 1020 (=255×4). In addition, when w2 is "2", the value of S_max at i=3 is 1530 (=255×4+255×2). When S_max is "0", E" is set to be E'.

In the present embodiment, the weight wi in Expressions (9) and (10) is same for all inks, but different weights may be used for identical ink in each expression.

Subsequently at S2609, the dot arrangement unit 2507 determines dot arrangement in the processing target region based on the evaluation value E" of each pixel in the processing target region. Specifically, dots in the target dot number calculated at step S2604 are arranged in the region sequentially for each pixel in the descending order of the evaluation value E". When the evaluation value E" is same between pixels, does are arranged in priority at a pixel for which the gradation value I is larger. As a result, dot arrangement is determined for a processing unit region as illustrated in FIG. 27C. Alternatively, a pixel in priority may be selected at random from among pixels between the evaluation value is same, or a pixel closer to the upper-left corner may be arranged in priority. A dot arrangement unit 2507 sets “1” to the output value of a pixel at which a dot is arranged in the processing target region, and sets “0” to the output value of a pixel at which no dot is arranged. FIG. 27D is a diagram illustrating the output value of each pixel.

Subsequently at S2610, the dot arrangement unit 2507 updates the dot history information 2511. Specifically, the output value of each pixel set at S2609 is stored on the memory in association with an ink color. At S2606 for the next ink color, the stored dot history information 2511 is acquired as the dot history of an ink color for which processing is already performed.

Subsequently at S2611, a quantized data production unit 2508 produces image quantized data from the output value of each unit region set at S2609, and outputs the produced quantized data to the RAM 212.

Subsequently at S2612, the ink color selection unit 2502 determines whether the quantized data of all ink colors is produced for the processing target region in accordance with the order of quantization. When it is determined that the quantized data of all ink colors is produced, the process proceeds to S2613. When there is ink for which the quantized data is yet to be produced, the process proceeds to S2601 to select the processing target color again and continue the quantization processing.

At S2613, the region selection unit 2501 determines whether the quantized data is produced for all pixels of an input image. Specifically, it is determined whether each divided block of the 4×4 pixels illustrated in FIG. 6 is selected as the processing target region and the quantized data is produced. For example, when the blocks are selected sequentially from the upper-left corner, it may be determined whether the processing region is a block closest to the lower-right corner. As a result of the determination, when the quantized data is produced for all pixels of the input image, the quantization processing is ended. When there is a pixel for which the quantized data is yet to be produced, the process proceeds to S2600 to select the processing region and continue the quantization processing.

The following specifically describes the quantization processing in the present embodiment with reference to FIGS. 28A to 28I and 29A to 29I. The description is first made on the quantization processing for K ink as the first color with reference to FIGS. 28A to 28I.

FIG. 28A illustrates the gradation data Ik of K ink in the processing target region. FIG. 28B illustrates thresholds for the processing target region.

In this case, at S2604, the target dot number is calculated to be “4” through comparison of an average value 60 of the gradation data Ik illustrated in FIG. 28A with each threshold illustrated in FIG. 28B.

FIG. 28C illustrates the evaluation value E calculated by using Expression (6) at S2605. FIG. 28D illustrates the exclusion control value H before normalization. Since K ink is the first color (w=1), H is “0” for all pixels in the region. Thus, the evaluation value E' after the exclusion processing at S2607 is E as illustrated in FIG. 28E.

Similarly, the accumulative gradation data S illustrated in FIG. 28F is “0” for all pixels in the region, and the evaluation value E" after the exclusion control processing illustrated in FIG. 28G is E. In this case, dot arrangement of K ink illustrated in FIG. 28H can be obtained by sequentially arranging four dots (dot number=4) at a pixel in the descending order of the evaluation value E" illustrated in FIG. 28G. In addition, the quantized data illustrated in FIG. 28I is stored on the memory as the dot history information 2511 in association with the weight w1=4.

FIGS. 29A to 29I illustrate the process of the quantization processing for C ink as the second color. FIGS. 29A and 29B illustrate gradation data Ic of C ink in the processing target region and thresholds for the processing target region, respectively. In this case, the evaluation value E illustrated in FIG. 29C and the number of dots=4 are calculated.

In addition, the exclusion control value H of each pixel illustrated in FIG. 29D is calculated from the quantized data of K ink illustrated in FIG. 28I and the weight w1=4 for K ink. In this case, H_max is “4”.

In addition, the evaluation value E' after the exclusion processing illustrated in FIG. 29E is calculated from the evaluation value E illustrated in FIG. 29C and the exclusion control value H normalization with H_max.

Similarly, the accumulative gradation data S of each pixel illustrated in FIG. 29F is calculated from the gradation data of K ink illustrated in FIG. 28A and the weight w1=4 for K ink. S_max is “1020” for w1=4. In addition, the evaluation value E" after the exclusion control processing illustrated in FIG. 29G is calculated from the evaluation value E' after the exclusion processing and the accumulative gradation data S normalized with S_max.

In this case, dot arrangement of C ink illustrated in FIG. 29H can be obtained by sequentially arranging four dots (dot number=4) at a pixel in the descending order of the evaluation value E" illustrated in FIG. 29G. In addition, the quantized data illustrated in FIG. 29I is stored on the memory as the dot history information 2511 in association with the weight w2=2 for C ink.

Similarly, FIGS. 30A to 30I illustrate the process of the quantization processing for M ink as the third color. In this example, H_max is “6”, S_max is “1530”, and the number of dots=“4”. Thus, the quantized data of M ink illustrated in FIG. 30I can be obtained.

In addition, FIGS. 31A to 31I illustrate the process of the quantization processing for Y ink as the fourth color. The weight w3 for M ink is “2”. In this example, H_max is “8”, S_max is “2040”, and the number of dots is “4”. Thus, the quantized data for Y ink illustrated in FIG. 31I can be obtained. Through the above-described processing, the quantized data for the four colors of C, M, K, and Y can be obtained.

Figure 32A:
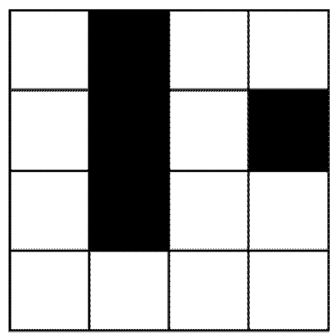
FIGS. 32A and 32B are diagrams illustrating inter-color exclusion processing and reduction processing results.
Figure 32B:
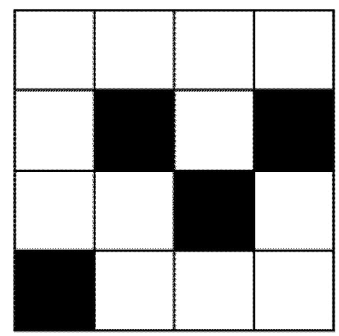

The following describes effects of the exclusion control in the present embodiment. When the processing target color is the second color or a later color 2, the exclusion control value H is a value based on already determined dot arrangement. For example, when the processing target color is C ink, the exclusion control value H is positive for a pixel at which a K dot is arranged, and a dot is unlikely to be arranged at the pixel. Specifically, FIG. 32A illustrates dot arrangement when dots in the dot number=4 are arranged based on the evaluation value E before the exclusion processing illustrated in FIG. 29C. Similarly, FIG. 32B illustrates dot arrangement when dots in the dot number=4 are arranged based on the evaluation value E' after the exclusion processing illustrated in FIG. 29E. As illustrated in FIG. 32A, in the dot arrangement based on the evaluation value E before the exclusion processing, a dot is arranged at a pixel at which K ink is arranged, and thus the arrangement is not exclusive between colors. However, as illustrated in FIG. 32B, in the dot arrangement based on the evaluation value E' after the exclusion processing, a dot is arranged at a pixel other than a pixel at which K ink is arranged. In other words, the arrangement exclusive between different colors is obtained. In this manner, the dot arrangement exclusive between different colors reduces dot overlapping and excessive paper white exposure. In particular, contrast increase in a local region in flat gradation data is reduced, and degradation of the granularity due to overlapping dots is reduced. In addition, color cloud due to overlapping between dots of different ink colors is reduced, and the color development characteristic is improved at a dark part (highly dense part), in particular.

However, for example, when the gradation data abruptly changes in the processing target region, it is not preferable to arrange dots of different colors exclusively from each other. For example, in the gradation data illustrated in FIGS. 28A, 29A, 30A, and 31A, a line of the four colors of C, M, Y, and K in mixture is formed on the second column from the left. However, in dot arrangement using the evaluation value E' after the exclusion control processing illustrated in FIG. 32B, dots of K and C do not overlap with each other, and an exclusive arrangement is achieved. Thus, no dot overlaps with pixels on which the line of the four colors in mixture should be formed, and the pixels are potentially not perceived as a line of a mixed color. Alternatively, coloring other than the mixed color potentially locally occurs.

However, in the dot arrangement based on the evaluation value E" after the exclusion control processing illustrated in FIG. 29H, dots of C ink and K ink overlap with each other on a CMYK mixed line. Similarly, dots of M ink and Y ink illustrated in FIGS. 30H and 31H are arranged on a CMYK mixed line. In other words, the dot arrangement in which exclusion is prevented to allow overlapping in a region where the gradation data abruptly changes is obtained by arranging dots in accordance with the evaluation value E' after the exclusion control processing. In addition, in this case, in the dot arrangement based on the evaluation value E" after the exclusion control processing, arrangement exclusive between different colors is obtained in a uniform region on the first column from the right on the gradation data.

However, in the dot arrangement based on the evaluation value E before the exclusion processing illustrated in FIG. 29C, dots of K ink and C ink overlap with each other, and the arrangement is not exclusive between different colors. In the present embodiment, when the gradation data I is flat, the accumulative gradation data S is flat. In this case, the absolute values of the evaluation values E' and E" change, but the relative magnitude relation therebetween does not change. Thus, the order of dot arrangement does not change between the evaluation values E' and E" in a flat gradation data region. Accordingly, a dot arrangement in which dots of different colors are exclusively arranged can be obtained in a flat gradation data region when the exclusion control processing using the accumulative gradation data S is performed.

In other words, in the present embodiment, dot history information is referred to, and evaluation values are corrected so that a dot is unlikely to be arranged at a pixel at which another dot is arranged. Then, the dot arrangement evaluation values are further corrected to reduce the above-described correction based on the contrast of the gradation data. Through such processing, in a region in which the contrast is low, inter-color exclusion target dots can be arranged in dispersion based on the magnitude of the threshold matrix, thereby improving the granularity. In a region in which the contrast is high, dot exclusion can be prevented based on the magnitude of the gradation data, thereby improving the reproducibility of shapes on image data.

Modifications of Fourth and Fifth Embodiments

In the above-described embodiments, the evaluation value E is described as a real number but may be calculated as an 8-bit integer.

The degree of exclusion in a flat region may be adjusted by multiplying the exclusion control value H and the accumulative gradation data S by a coefficient of 0 to 1. In this case, when the coefficient is "1", results same as those of the above-described embodiments can be obtained. As the coefficient is smaller, the exclusion processing in a flat region is reduced, and the number of dots at which overlapping between colors occurs increases. When the coefficient is "0", the exclusion processing is not performed for a uniform region. For example, the coefficients for the exclusion value H and the gradation data S may be determined in accordance with misregistration (relative positional shift) between colors assumed for a printer. Specifically, robustness against the misregistration between colors can be improved by performing adjustment such as decrease of the coefficients in a region in which the relative positional shift between colors is large and color unevenness is noticeable.

The above-described misregistration is hardly sensed at a highlight part in which the number of dots is small, and thus the above-described coefficients may be controlled in accordance with the luminance of an input image.

In addition, an exclusion target color may be limited. Specifically, the above-described processing may be performed only for the exclusion target color, and normal dither processing may be performed for a non exclusion target color (or the above-described coefficients are set to be zero for the non exclusion target color).

In the fifth embodiment, the target dot number is equal to or smaller than 16 in a 4×4-pixel unit region. However, when multiple nozzle arrays are provided or when identical ink can be discharged over each pixel by scanning an identical region multiple times, dots in a number exceeding 16 are arranged in the region in some cases. For example, when ink can be discharged at each pixel up to twice, the gradation data and I_max may be determined so that I/I_max in the gradation data is normalized to 0 to 2. Then, th/th_max may be normalized to 0 to 1, and the number of dots to be arranged in the region may be calculated with the gradation data and the threshold thus normalized. Specifically, first, dots may be arranged one by one at a pixel for which I/I_max is equal to or larger than one, and then one may be subtracted from I/I_max of a pixel at which a dot is arranged, and any remaining dot may be arranged. In this case, history information 1111 may hold the number of arranged dots, which is 0 to 2, for each pixel.

The printing head can form dots at different discharge amounts in some cases. For example, processing can be performed similarly when large, intermediate, and small dots are formed. For example, the small dot may be arranged at a pixel at which one dot is arranged, the intermediate dot may be arranged at a pixel at which two dots are arranged, and the large dot may be arranged at a pixel at which three dots are arranged.

In the fourth and fifth embodiments, the threshold matrix different for each ink color is used for the dot number calculation and the dot arrangement order acquisition. However, an identical threshold matrix may be used for all ink colors or multiple ink colors. Particularly in a flat region, an accumulative dot pattern of all ink colors is a pattern generated based on a single threshold matrix, and thus dot dispersity improves. In addition, when exclusion processing is performed with weighted dots of different colors, the dots can be arranged in the order of dot luminance including dot overlapping. Accordingly, the contrast between the dots can be reduced, thereby achieving further improvement of the granularity.

In the fourth and fifth embodiments, the exclusion control value H and the accumulative gradation data S are calculated with reference to dot arrangement of all colors processed before the processing target color. However, exclusion control may be performed only between some of the colors. In this case, the exclusion control value H and the accumulative gradation data S may be generated only from dot patterns of specified colors by means for specifying a reference color. In addition, the accumulative gradation data S of an interest color may be calculated by summing the gradation data of the interest color.

Other Embodiments

In the above-described first to fifth embodiments, all image processing illustrated in FIG. 3 is performed by the image processing apparatus (host PC) 200 illustrated in FIG. 2, but the present invention is not limited to such a configuration. Part of the image processing illustrated in FIG. 3 may be performed by the host PC, and the remaining processing may be performed by the printing apparatus 100, or all processing may be performed by the printing apparatus 100. Alternatively, a process up to halfway through the quantization processing described with reference to FIGS. 5 and 10 may be performed by the host PC, and the remaining process may be performed by the printing apparatus. In any case, a device configured to perform the quantization processing according to the present invention is the image processing apparatus according to the present invention. When the quantization processing is performed by the host apparatus and the printing apparatus in cooperation, this entire print system is the image processing apparatus according to the present invention.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access the memory (RAM), a read only the memory (ROM), a storage of distributed computing systems, an optical disk (such as a compact disc (CD), digital versatile disc (DVD), or Blu-ray Disc (BD)™), a flash memory device, a memory card, and the like.

The present invention can provide quantization processing that can reduce color development defect due to dot overlapping and can output an image with reduced granularity and excellent sharpness when the image is printed by using multiple kinds of colorants.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2018-229551 filed Dec. 7, 2018, and No. 2019-013881 filed Jan. 30, 2019, which are hereby incorporated by reference wherein in their entirety.

What is claimed is:

1. An image processing apparatus that determines dot arrangement for each of a plurality of kinds of colorants by using a threshold matrix based on an image for the colorant, the image processing apparatus comprising:

an acquisition unit configured to acquire an output value at an interest pixel included in a predetermined region for a first color for which dot arrangement is determined among the plurality of kinds of colorants;

a target value derivation unit configured to derive, based on a pixel value in the predetermined region of the image for a second color for which dot arrangement is yet to be determined among the plurality of kinds of colorants, a target value for a colorant of the second color in the predetermined region;

a calculation unit configured to calculate an exclusion control value for controlling a degree of dot exclusion at the interest pixel for the second color based on the output value at the interest pixel for the first color and a pixel value of the first color at the interest pixel; and a determination unit configured to determine an output value for the second color at the interest pixel based on the target value, a pixel value of the second color at the interest pixel, the exclusion control value, and the threshold matrix, wherein the calculation unit calculates the exclusion control value so that the exclusion control value calculated in a case where the output value for the first color at the interest pixel indicates that a dot is arranged at the interest pixel and contrast near the interest pixel is high is lower than the exclusion control value calculated in a case where a degree of exclusion for the second color indicates that a dot is arranged at the interest pixel and the contrast near the interest pixel is low.

2. The image processing apparatus according to claim 1, wherein the calculation unit does not perform dot exclusion for the second color at the interest pixel in a case where the output value for the first color at the interest pixel indicates that no dot is arranged at the interest pixel.

3. The image processing apparatus according to claim 1, wherein the calculation unit further includes a first correction unit configured to correct a threshold for the interest pixel based on the output value for the first color at the interest pixel, and a second correction unit configured to further correct the threshold corrected by the first correction unit, by using the exclusion control value in accordance with the pixel value of the first color at the interest pixel and a pixel value of the first color at a pixel adjacent to the interest pixel, and the determination unit quantizes the pixel value of the second color at the interest pixel by using the threshold corrected by the second correction unit.

4. The image processing apparatus according to claim 3, wherein the first correction unit does not correct the threshold in a case where the output value for the first color at the interest pixel indicates that no dot is arranged at the interest pixel.

5. The image processing apparatus according to claim 3, wherein the first correction unit corrects the threshold for the interest pixel by subtracting the pixel value of the first color at the interest pixel from the threshold for the interest pixel.

6. The image processing apparatus according to claim 3, further comprising a contrast calculation unit configured to calculate a contrast value indicating contrast near the interest pixel based on the pixel value of the first color at the interest pixel and a pixel value of the first color at a pixel adjacent to the interest pixel, wherein the second correction unit calculates the exclusion control value in accordance with the contrast value.

7. The image processing apparatus according to claim 1, further comprising:

a target dot number determination unit configured to calculate a target dot number for the second color in a predetermined region; and an evaluation value calculation unit configured to calculate an evaluation value for the second color at each pixel included in the predetermined region based on pixel values of the second color at the pixels included in the predetermined region and thresholds in the threshold matrix corresponding to the predetermined region, wherein the determination unit determines an output value at each pixel in the predetermined region based on the target dot number and the evaluation value.

8. The image processing apparatus according to claim 7, wherein the calculation unit corrects, based on the exclusion control value, the evaluation value of each pixel calculated by the evaluation value calculation unit.

9. An image processing method for determining dot arrangement for each of a plurality of kinds of colorants by using a threshold matrix based on an image for the colorant, the image processing method comprising:

acquiring an output value at an interest pixel for a first color for which dot arrangement is determined among the plurality of kinds of colorants;

deviating a target value, based on a pixel value in a predetermined region of the image for a second color for which dot arrangement is yet to be determined among the plurality of kinds of colorants, for a colorant of the second color in the predetermined region;

calculating an exclusion control value for controlling a degree of dot exclusion at the interest pixel for the second color based on the output value for the first color at the interest pixel and a pixel value of the first color at the interest pixel; and determining an output value for the second color at the interest pixel based on the target value, a pixel value of the second color at the interest pixel, the exclusion control value, and the threshold matrix, wherein the exclusion control value calculated in a case where the output value for the first color at the interest pixel indicates that a dot is arranged at the interest pixel and contrast near the interest pixel is high is lower than the exclusion control value calculated in a case where a degree of exclusion for the second color indicates that a dot is arranged at the interest pixel and the contrast near the interest pixel is low.

10. A non-transitory computer readable storage medium storing a program for causing a computer to function as each unit of an image processing apparatus that determines dot arrangement for each of a plurality of kinds of colorants by using a threshold matrix based on an image for the colorant, the image processing apparatus comprising:

an acquisition unit configured to acquire an output value at an interest pixel included in a predetermined region for a first color for which dot arrangement is determined among the plurality of kinds of colorants;

a target value derivation unit configured to derive, based on a pixel value in the predetermined region of the image for a second color for which dot arrangement is yet to be determined among the plurality of kinds of colorants, a target value for a colorant of the second color in the predetermined region;

a calculation unit configured to calculate an exclusion control value for controlling a degree of dot exclusion at the interest pixel for the second color based on the output value at the interest pixel for the first color and a pixel value of the first color at the interest pixel; and a determination unit configured to determine an output value for the second color at the interest pixel based on the target value, a pixel value of the second color at the interest pixel, the exclusion control value, and the threshold matrix, wherein the calculation unit calculates the exclusion control value so that the exclusion control value calculated in a case where the output value for the first color at the interest pixel indicates that a dot is arranged at the interest pixel and contrast near the interest pixel is high is lower than the exclusion control value calculated in a case where a degree of exclusion for the second color indicates that a dot is arranged at the interest pixel and the contrast near the interest pixel is low.

11. An image processing apparatus that determines dot arrangement for each of a plurality of kinds of colorants by using a threshold matrix based on an image for the colorant, the image processing apparatus comprising:

an acquisition unit configured to acquire an output value at an interest pixel included in a predetermined region for a first color for which dot arrangement is determined among the plurality of kinds of colorants and acquire an information of object type of the interest pixel;

a target value derivation unit configured to derive, based on a pixel value in the predetermined region of the image for a second color for which dot arrangement is yet to be determined among the plurality of kinds of colorants, a target value for a colorant of the second color in the predetermined region;

a calculation unit configured to calculate an exclusion control value for controlling a degree of dot exclusion at the interest pixel for the second color based on the output value at the interest pixel for the first color, a pixel value of the first color at the interest pixel and the acquired information of object type, the exclusion control value at the interest pixel being calculated so as to be lower than the exclusion control value at a pixel which is not a part of a character or a line in the image in a case where the interest pixel is a part of a character or a line; and a determination unit configured to determine an output value for the second color at the interest pixel based on the target value, a pixel value of the second color at the interest pixel, the exclusion control value, and the threshold matrix.

12. An image processing apparatus that determines dot arrangement for each of a plurality of kinds of colorants by using a threshold matrix based on an image for the colorant, the image processing apparatus comprising:

an acquisition unit configured to acquire an output value at an interest pixel included in a predetermined region for a first color for which dot arrangement is determined among the plurality of kinds of colorants and acquire an information of printing positional shift;

a target value derivation unit configured to derive, based on a pixel value in the predetermined region of the image for a second color for which dot arrangement is yet to be determined among the plurality of kinds of colorants, a target value for a colorant of the second color in the predetermined region;

a calculation unit configured to calculate an exclusion control value for controlling a degree of dot exclusion at the interest pixel for the second color based on the output value at the interest pixel for the first color, a pixel value of the first color at the interest pixel and the acquired information of printing positional shift, the exclusion control value being calculated so that the exclusion control value is maintained in a constant range even though an amount of the printing positional shift varies with reciprocate scanning of a printing head; and a determination unit configured to determine an output value for the second color at the interest pixel based on the target value, a pixel value of the second color at the interest pixel, the exclusion control value, and the threshold matrix.

* * * * *